United States Patent [19]

Yagyu et al.

[11] Patent Number: 5,684,874
[45] Date of Patent: Nov. 4, 1997

[54] RINGTRIP JUDGING CIRCUIT

[75] Inventors: Tetsuo Yagyu, Yokohama; Takahiro Watai, Kawasaki; Hirokazu Tanaka, Kawasaki; Tetsuji Funaki, Kawasaki; Kunihiko Gotoh, Kawasaki, all of Japan

[73] Assignee: Fujitsu Limited, Kanagawa, Japan

[21] Appl. No.: 559,163

[22] Filed: Nov. 13, 1995

[30] Foreign Application Priority Data

Nov. 10, 1994 [JP] Japan ................... 6-276422

[51] Int. Cl.$^6$ ................................ H04M 1/00
[52] U.S. Cl. .................. 379/382; 379/382; 379/377
[58] Field of Search .................... 379/382, 377

[56] References Cited

U.S. PATENT DOCUMENTS 4,455,456  6/1984  Cochran ....................... 379/377
4,677,664  6/1987  Siligoni et al. .................. 379/382
5,293,420  3/1994  Nagato ........................... 379/382
5,402,482  3/1995  Minohara ........................ 379/377

*Primary Examiner*—Dwayne Bost
*Assistant Examiner*—Keith Ferguson
*Attorney, Agent, or Firm*—Helfgott & Karas, P.C.

[57] ABSTRACT

A ringtrip judging circuit includes a single comparator for comparing a detection value of a ringing current with a threshold value and for outputting the result of the comparison, a threshold value control circuit for supplying the threshold value to the comparator, and a judging circuit for judging ringtrip based on the output of the comparator. During a prescribed period after ringing signal transmission, the threshold value control circuit changes the threshold value in a steplike manner in accordance with the result of the comparison, thereby determining a threshold value greater than a peak value during the prescribed period, and based on it, determines a threshold value for ringtrip judgement and supplies it to the comparator.

10 Claims, 19 Drawing Sheets

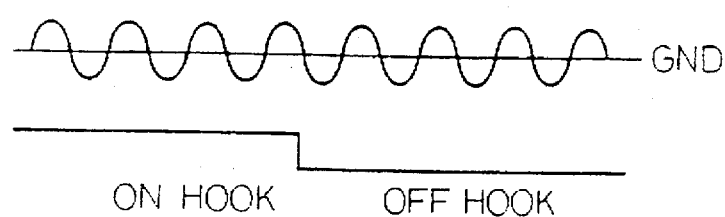
Fig.3(a) PRIOR ART
ON HOOK    OFF HOOK
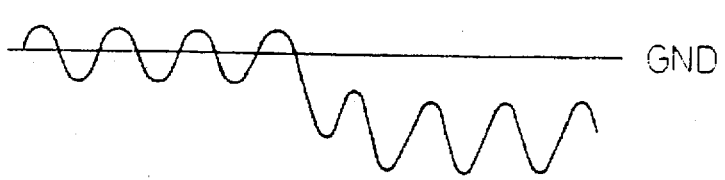
Fig.3(b) PRIOR ART
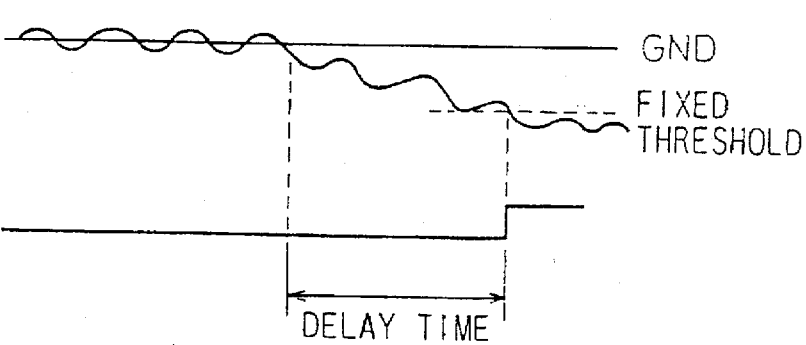
Fig.3(c) PRIOR ART
Fig.3(d) PRIOR ART
DELAY TIME
→ t

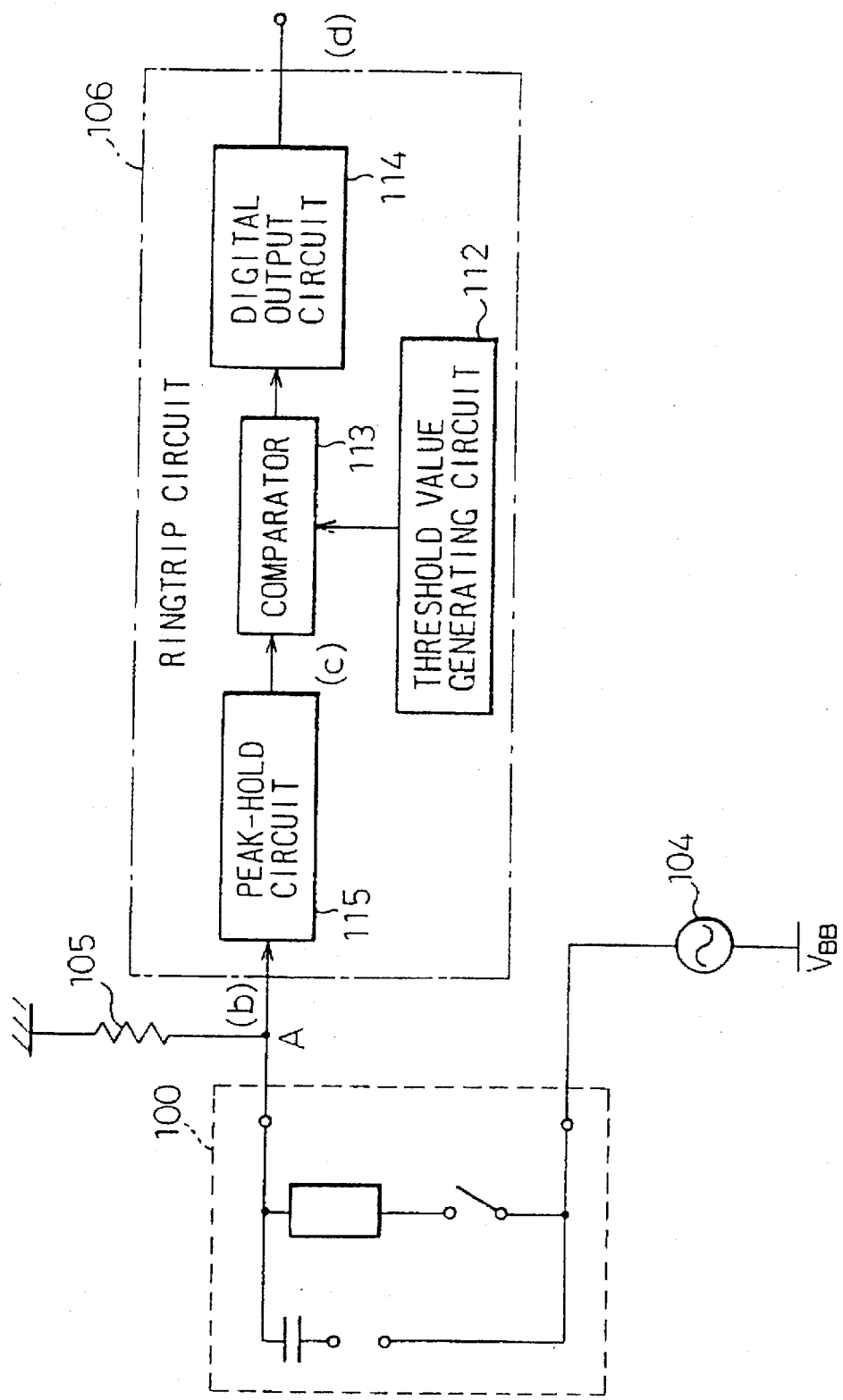

ON HOOK    OFF HOOK

FIXED THRESHOLD

DELAY TIME
→ t

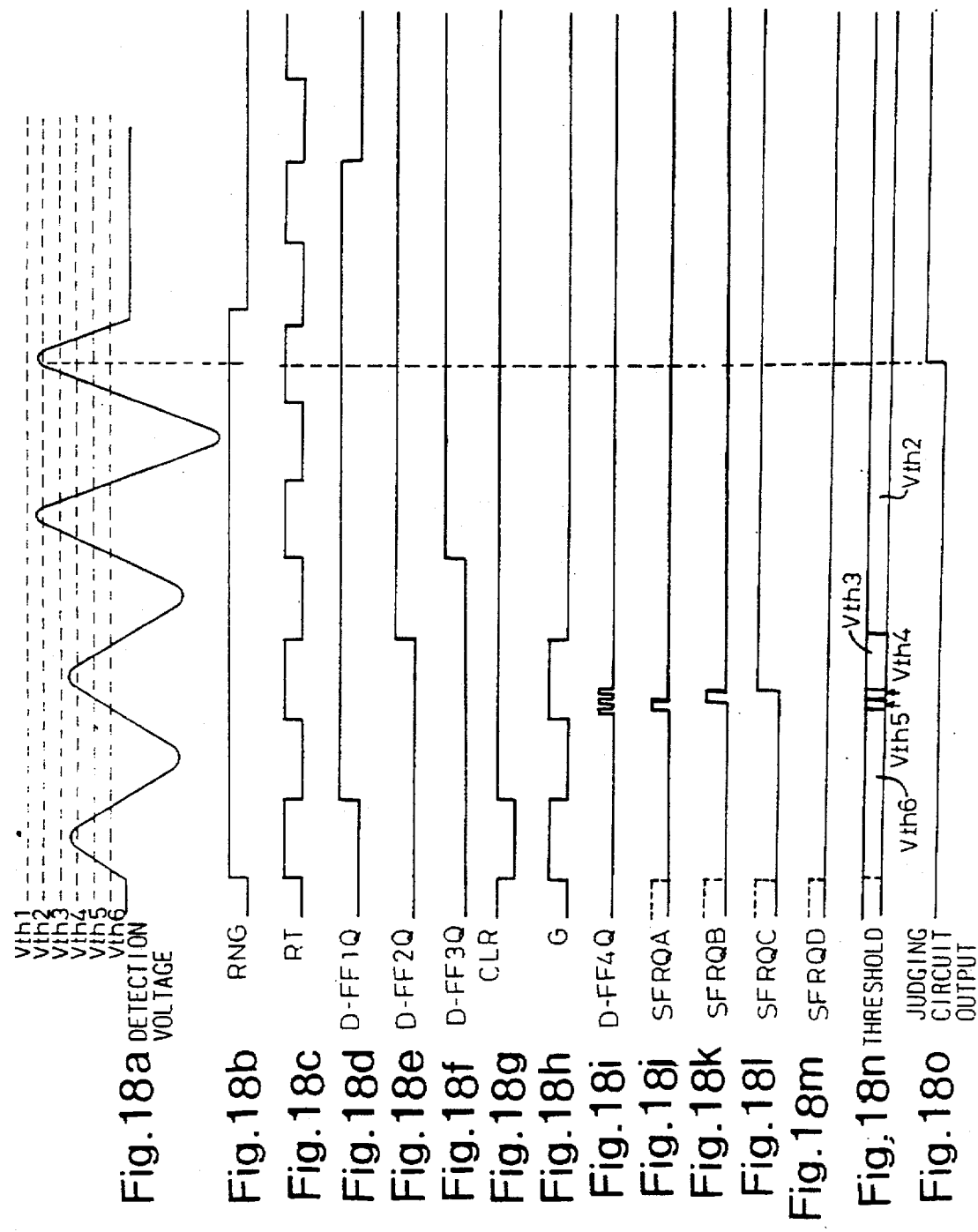

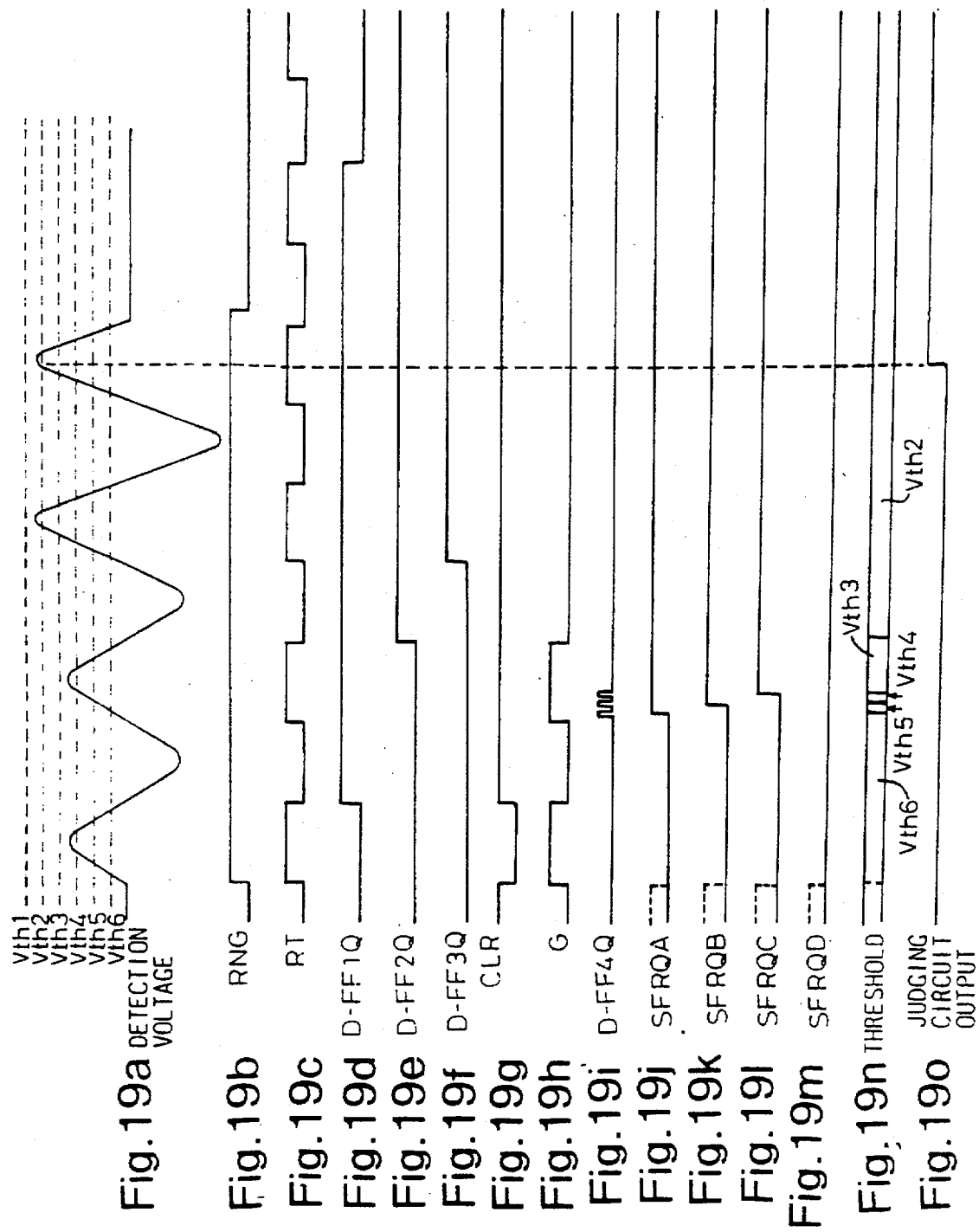

RINGTRIP JUDGING CIRCUIT

BACKGROUND OF THE INVENTION

1. Field of the Invention

The present invention relates to a ringtrip circuit for detecting a called party's answer condition in a subscriber circuit, and more particularly to a ringtrip judging circuit in which a threshold value for ringtrip judgement is made variable.

2. Description of the Related Art

A ringtrip circuit, which is contained in a subscriber circuit for handling high-voltage signals and analog signals necessary as a subscriber line interface between a telephone terminal and a local exchange, functions to detect an off-hook condition of the subscriber telephone (called party answer) during the transmission of a ringing signal over the subscriber line.

Ringtrip circuits are required to be resistant to noise and other interference, be stable in operation, and be easy to implement in a high density LSI.

FIG. 1 is a block diagram showing the basic configuration of a subscriber circuit. As shown, a telephone 100 is connected to a talking current supply circuit 102 through a subscriber line 101, and further connected to incoming and outgoing lines in a four-wire circuit via a two-wire/four-wire conversion circuit 103. Reference numeral 104 is a ringing generator for generating a ringing signal which is applied to the subscriber line; 105 is a ringtrip detection resistor for detecting a ringtrip condition occurring at the subscriber end; and 106 is a ringtrip circuit. Further, reference numeral 107 is a polarity inversion circuit for preventing the ringing signal being applied to the subscriber line from flowing to the talking current supply circuit side.

FIG. 2 shows a first prior art example of the ringtrip circuit. In this example, the change of the DC component in the subscriber current when the subscriber telephone goes off-hook is compared in a comparator with a threshold voltage set by a threshold value generating circuit, to detect an off-hook condition, and based on the result of the detection, a digital output circuit outputs a digital signal indicating the detection of the off-hook condition.

In the figure, parts corresponding to those shown in FIG. 1 are designated by the same reference numerals. The ringtrip circuit 106 contains a filter 111 for removing AC components in the detected signal, a threshold value generating circuit 112 for generating a threshold voltage for ringtrip detection, a comparator 113 for comparing the detected signal with the threshold, and a digital output circuit 114 for outputting the result of the detection as a digital signal.

FIG. 3 shows signal waveforms at various points in the first prior art circuit. Part (a) shows a ringing signal at point A at the input side of the ringtrip circuit and an on-hook to off-hook transition at the subscriber side; as shown, the ringing signal is a constantly varying AC voltage whose waveform is symmetrical with respect to ground potential (GND). Since the DC potential at point A changes with the impedance change occurring when the called party goes off-hook, the input signal to the ringtrip circuit will be as shown in part (b).

In the ringtrip circuit 106, the input signal at point A is filtered through the filter 111 where AC components are removed, and a signal such as shown in part (c) is input to the comparator 113. The comparator 113 compares this input signal with a fixed threshold voltage Vth generated by the threshold value generating circuit 112, and produces an output signal indicating the detection of the input signal dropping below the threshold voltage Vth. In response to the detection signal from the comparator 113, the digital output circuit 114 outputs a signal going high as shown in part (d).

FIG. 4 shows a second prior art example of the ringtrip circuit. In this example, the ringing signal whose peak value is preserved by a peak-hold circuit is compared in the comparator with the threshold voltage set by the threshold value generating circuit, to detect an off-hook condition, and based on the result of the detection, the digital output circuit outputs a digital signal indicating the detection of the off-hook condition. In the figure, the same parts as those shown in FIG. 2 are designated by the same reference numerals, while the peak-hold circuit for holding and outputting the peak value of the input signal is indicated by reference numeral 115.

FIG. 5 shows signal waveforms at various points in the second prior art circuit, parts (a) and (b) being identical to those shown in connection with the first prior art example. In the ringtrip circuit 106, the peak-hold circuit 115 holds the peak of the input signal, and generates an output signal such as shown in part (c), which is input to the comparator 113.

The comparator 113 compares this input signal with the fixed threshold voltage Vth generated by the threshold generating circuit 112, and produces an output signal indicating the detection of the input signal dropping below the threshold voltage Vth. In response to the detection signal from the comparator 113, the digital output circuit 114 outputs a signal going high as shown in part (d).

A third prior art example is disclosed in Japanese Unexamined Patent Publication No. 62-77746. According to the ringtrip detection method described in this prior art, two different threshold levels are used, and the difference between the period during which the input signal is greater than the first threshold level and the period during which the input signal is smaller than the second threshold level is obtained, an off-hook condition being detected when the magnitude of this difference exceeds a predetermined value.

FIG. 6 shows a fourth prior art example of the ringtrip circuit, in which a plurality of different threshold levels are provided and an off-hook condition is detected using the peak value of the ringing current flowing when the transmission of ringing is started. In the example shown, an output voltage Vs from a voltage detector is compared in voltage comparators 200 with the respectively different threshold values Vth1–Vth6, and the results are latched into flip-flops 202 and into latching circuits 204 and 206 in sequence and displaced in time; then, the difference between the previously latched value and the currently latched value is obtained through gates 208, and the resulting output is sent out through an OR output section 210, an off-hook condition thus being detected based on the change of the output voltage Vs.

The ringtrip circuit shown in FIG. 2 uses a filter in its input portion; however, since the frequency of the ringing signal is low, this configuration has a large capacitance to the ground, and as a result, there occurs a certain lag (delay time) between the occurrence of an off-hook condition and the output of the signal indicating the detection of the off-hook condition, as shown in part (d) of FIG. 3. The resulting problem is increased ringtrip operation time.

The ringtrip circuit shown in FIG. 4 uses a peak-hold circuit instead of a filter in its input portion. This configuration therefore does not require a large capacitance, and hence, the lag is small and the ringtrip operation time can be reduced. However, in the circuit of FIG. 4, as well as the circuit of FIG. 2, since only one threshold level is used, it is difficult to set an appropriate threshold value that can allow for all load conditions of the subscriber circuit, and the problem is that these circuits are prone to malfunctions due to noise and other interference.

On the other hand, the method disclosed in Japanese Unexamined Patent Publication No. 62-77746 has the advantage that it does not require the provision of a filter or the like in its input portion, but the problem is increased complexity of circuitry, which necessarily involves an increase in circuit size. Furthermore, since only one threshold level is used, the same problem as outlined above arises with this prior art as well.

The ringtrip circuit shown in FIG. 6 requires the same number of comparators and the same number of reference voltages as the number of threshold values used, to provide a plurality of threshold values for selection. Further, to reliably detect a ringtrip condition regardless of changes in load conditions, the number of threshold values must be increased. This leads to the problem of increased circuit size and increased power consumption.

SUMMARY OF THE INVENTION

The present invention is aimed at resolving the above enumerated problems with the prior art, and it is an object of the invention to provide a ringtrip judging circuit that is capable of accomplishing ringtrip judgement quickly, that is resistant to noise and other interference and is stable in operation, and that is capable of detecting an off-hook condition by providing a plurality of threshold values for one comparator and selecting an optimum threshold value for a ringing signal, thus making it simple in circuitry and achieving low power consumption, lending itself to large scale integration.

According to the present invention, there is provided a ringtrip judging circuit comprising: a single comparator for comparing a detection value of a ringing current with a threshold value and for outputting the result of the comparison; a threshold value control circuit for, during a prescribed period after the initiation of ringing signal transmission, supplying to the comparator a first threshold value that is a function of the result of the comparison output from the comparator, thereby determining a second threshold value optimum for ringtrip judgement, and for supplying the second threshold value to the comparator; and a judging circuit for judging ringtrip based on the result of the comparison that the comparator outputs during application of the second threshold value.

BRIEF DESCRIPTION OF THE DRAWINGS

FIG. 3 is a diagram showing signal waveforms at various points in the first prior art circuit;

FIG. 4 is a diagram showing a ringtrip circuit according to a second prior art example;

FIG. 18 is a timing chart showing various signals in the ringtrip judging circuit shown in FIGS. 13 and 15; and FIG. 19 is a timing chart showing various signals in the ringtrip judging circuit shown in FIGS. 14, 16, and 17.

DESCRIPTION OF THE PREFERRED EMBODIMENTS

In the present invention, a sinusoidally varying voltage based on the ringing current flowing in an on-hook condition is detected in an early stage of ringing to a terminal, such as a telephone set, connected to a telephone line, and the detected voltage is compared in a comparator with a threshold value; if the detected voltage is higher than the threshold voltage, the threshold value is raised by one step at a time and a comparison is made once again, the process being repeated until a threshold value corresponding to the peak current of ringing is determined.

Based on the threshold value corresponding to the peak current of ringing, a threshold value for off-hook detection is established, and thereafter, if the detected voltage based on the ringing current exceeds this threshold value, it is determined that an off-hook condition has been detected. The selection of the threshold value for the detected voltage based on the ringing current in the early stage of the ringing in an on-hook condition is made during the second wave period of the sinusoidally varying ringing current in order to avoid the effects of abnormal voltage detection due to transients during ringing signal transmission.

Figure 1:
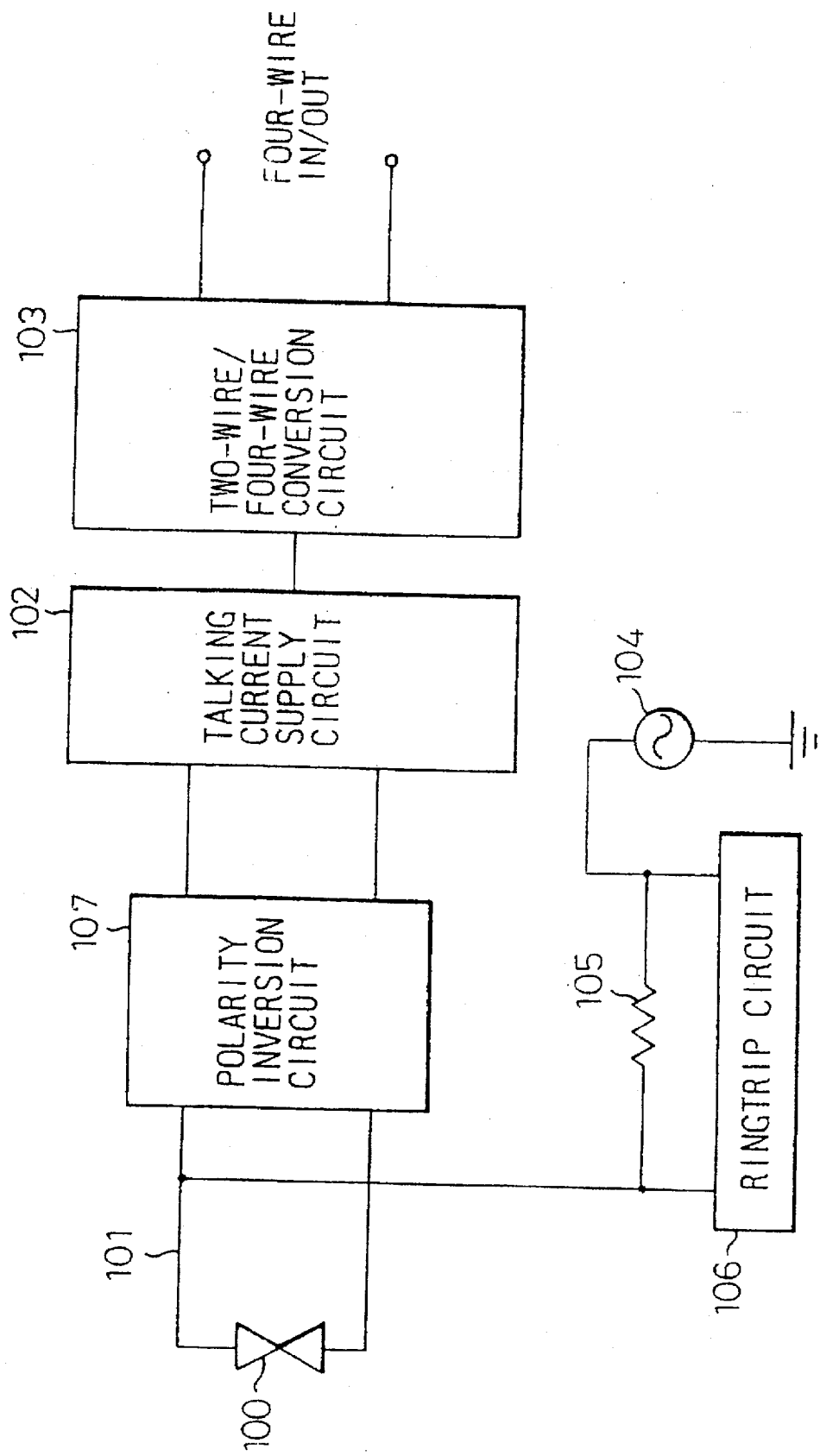
FIG. 1 is a block diagram showing the basic configuration of a subscriber circuit.
Figure 2:
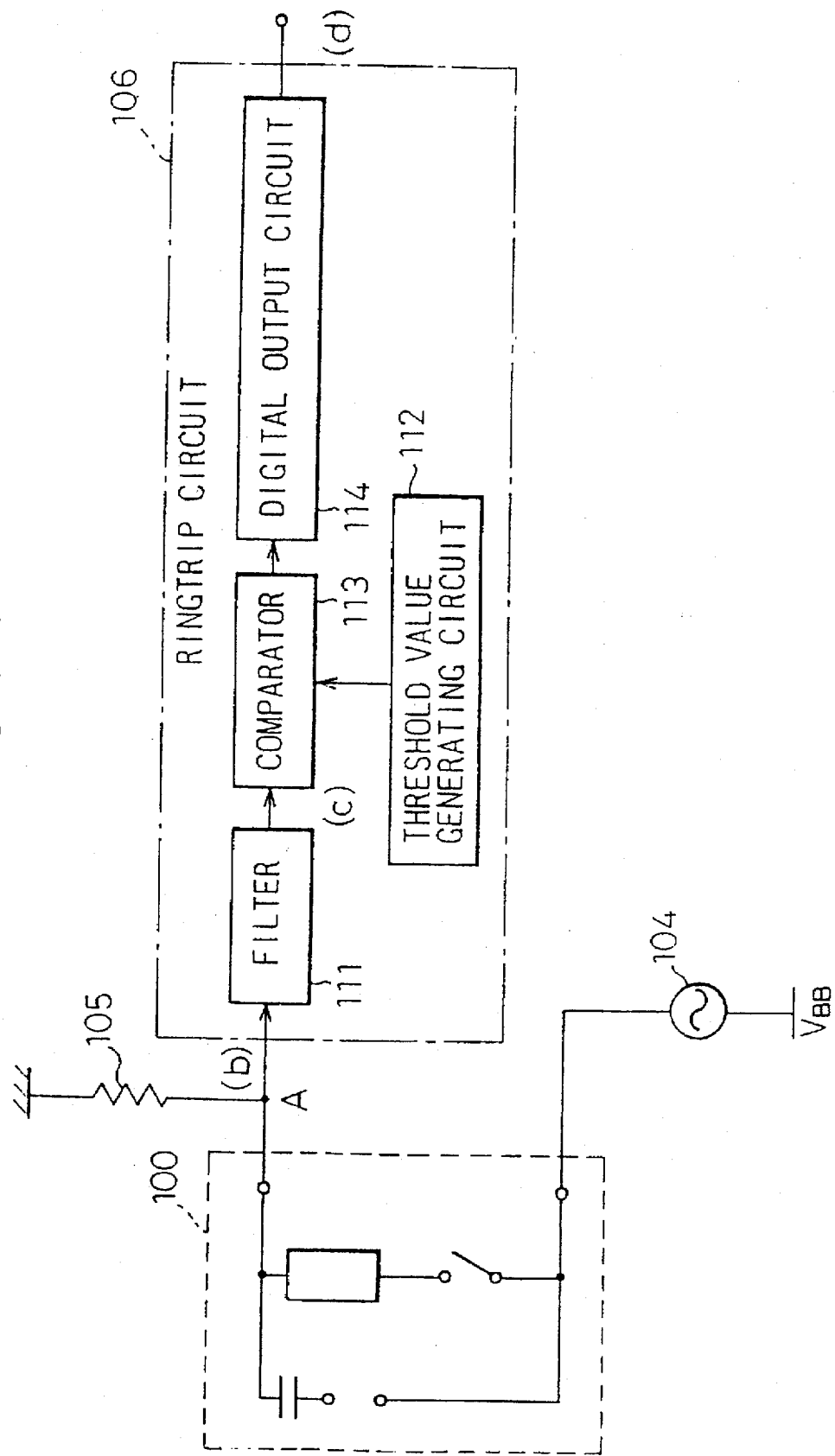
FIG. 2 is a diagram showing a ringtrip circuit according to a first prior art example.
Figure 5A:
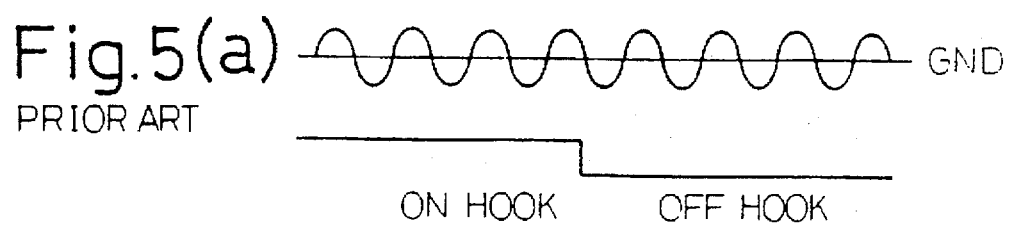
FIG. 5 is a diagram showing signal waveforms at various points in the second prior art circuit.
Figure 5B:
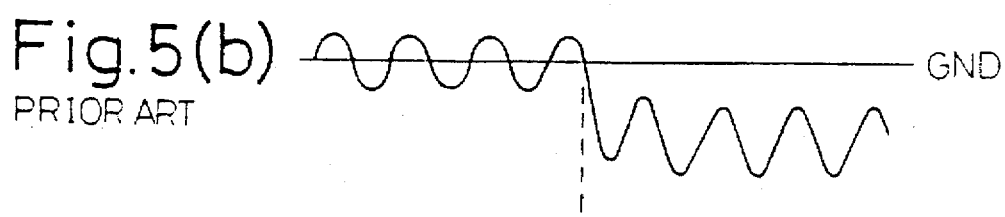
Figure 5C:
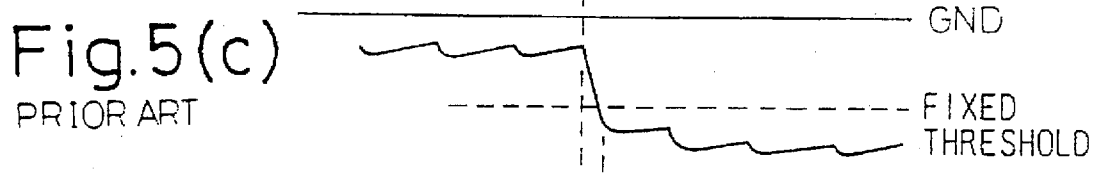
Figure 5D:
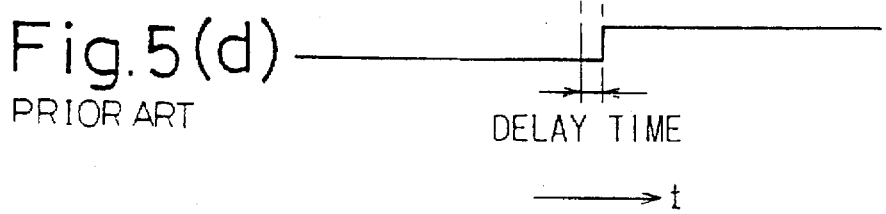
Figure 6:
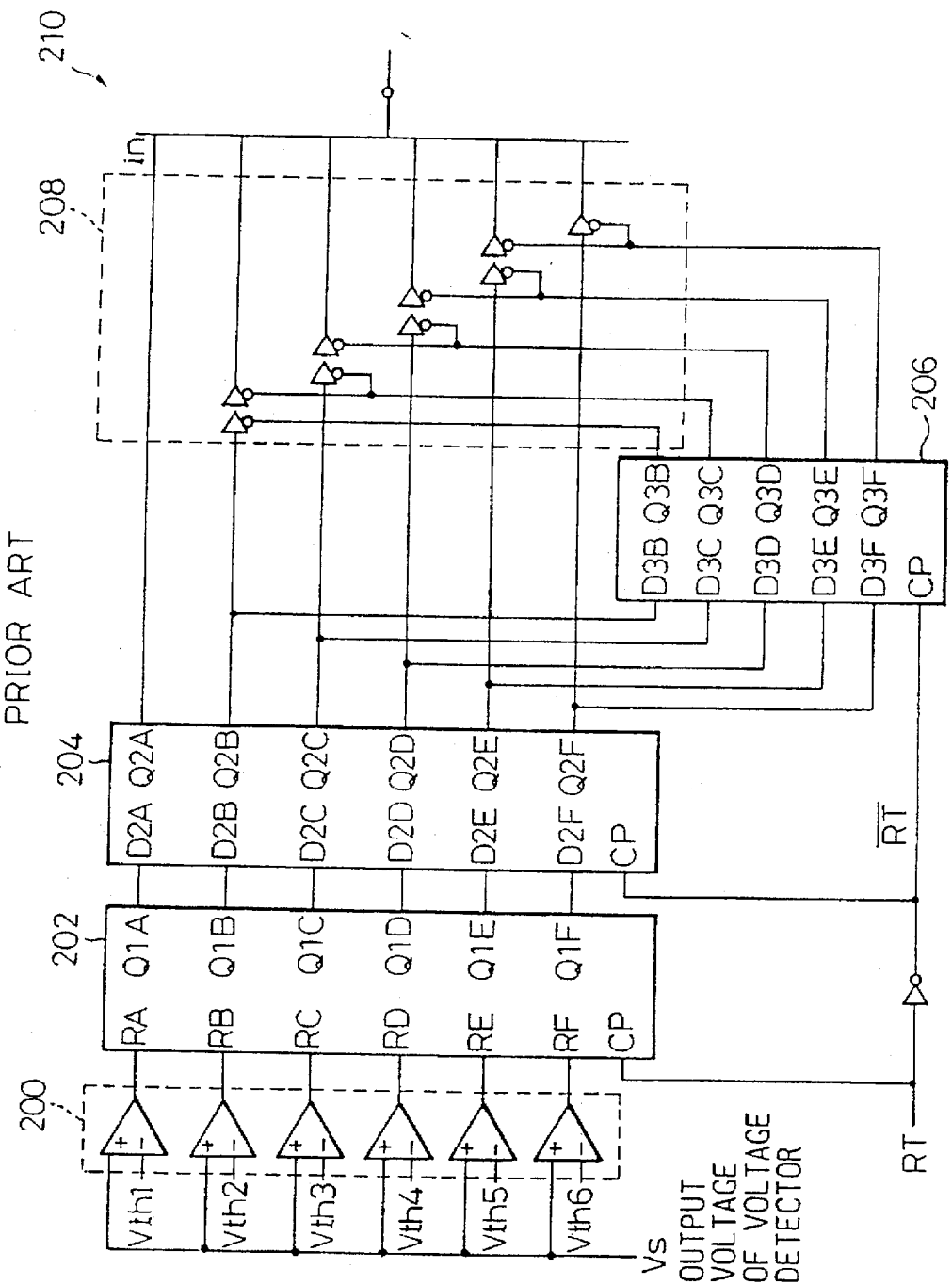
FIG. 6 is a diagram showing a ringtrip circuit according to a fourth prior art example.
Figure 7:
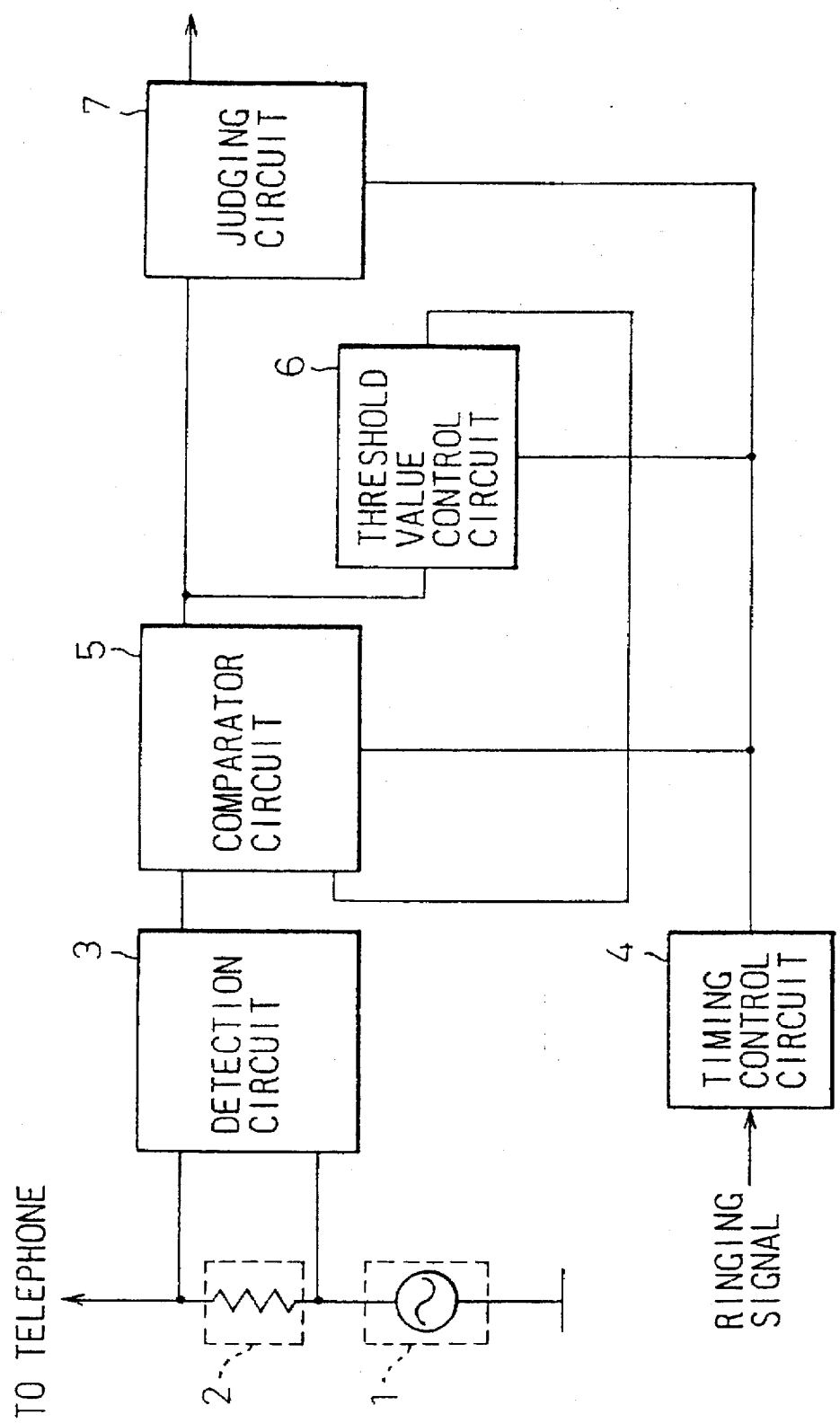
FIG. 7 is a block diagram showing the basic functional configuration of the present invention.

FIG. 7 shows the basic functional configuration of the present invention. In the figure, reference numeral 1 is a ringing generator; 2 is a ringtrip detection resistor; 3 is a detection circuit for detecting the voltage across the ringtrip detection resistor 2 and for outputting the detected voltage; and 4 is a timing control circuit for generating timing signals for controlling the operation of various parts, in synchronism with the timing of ringing transmission at the ringing generator 1.

Further, reference numeral 5 is a comparator circuit for outputting a value that is different depending on whether the output value of the detection circuit 3 is less than or greater than the threshold voltage; 6 is a threshold value control circuit for generating under the control of the timing control circuit 4 a threshold value optimum in an on-hook condition, based on a value selected from among a plurality of reference voltages in accordance with the result of the comparison from the comparator circuit 5, and for changing this threshold value to an optimum threshold voltage for off-hook detection for output; and 7 is a judging circuit for producing an output indicating the detection of an off-hook condition when, after setting the threshold voltage for off-hook detection, the comparator circuit 5 has detected the output voltage of the detection circuit 3 exceeding this threshold voltage.

When a call occurs, ringing signal transmission to the called telephone is initiated, and a voltage proportional to the ringing current appears across the ringtrip detection resistor 2. The detection circuit 3 detects this voltage. Immediately after the initiation of the ringing signal transmission, the timing control circuit 4 initializes the threshold value control circuit 6 and the judging circuit 7, as a result of which the threshold voltage generated by the threshold value control circuit 6 is set to the minimum value.

Under the control of the timing control circuit 4, and with the input timing of the second wave of the ringing current after the initiation of ringing signal transmission, the threshold value control circuit 6 performs an operation to raise the threshold voltage by one step each time the detected voltage from the detection circuit 3 exceeds the threshold voltage generated by the threshold value control circuit 6 when they are compared in the comparator circuit 5. By repeating this operation, the lowest threshold voltage is selected from among the threshold voltages exceeding the peak value of the detected voltage on the second wave of the ringing current after the ringing signal transmission.

Immediately after determining the threshold voltage from the second wave of the ringing current after the initiation of ringing signal transmission, the threshold value control circuit 6 establishes, under the control of the timing control circuit 4, the voltage value suitable for off-hook detection based on the value of the above-determined threshold voltage, and in this state, the comparator circuit 5 starts an off-hook monitoring operation.

More specifically, the threshold value control circuit 6 estimates from the output voltage of the detection circuit 3 in an on-hook condition a threshold voltage with which to detect the increase in the output voltage of the detection circuit 3 corresponding to the increase in the dc component and amplitude caused by off-hook, and sets this as the new threshold voltage. The comparator circuit 5 performs the monitoring operation using this threshold value.

After the threshold voltage for off-hook detection is set by the threshold value control circuit 6, if a signal is output from the comparator circuit 5, indicating that the output voltage of the detection circuit 3 has exceeded the threshold voltage, the judging circuit 7 produces an output signifying the occurrence of a ringtrip condition, for example, when such an output voltage has occurred for two or more wave periods in succession. This is to avoid erroneous ringtrip decisions due to noise or other interference.

Figure 8:
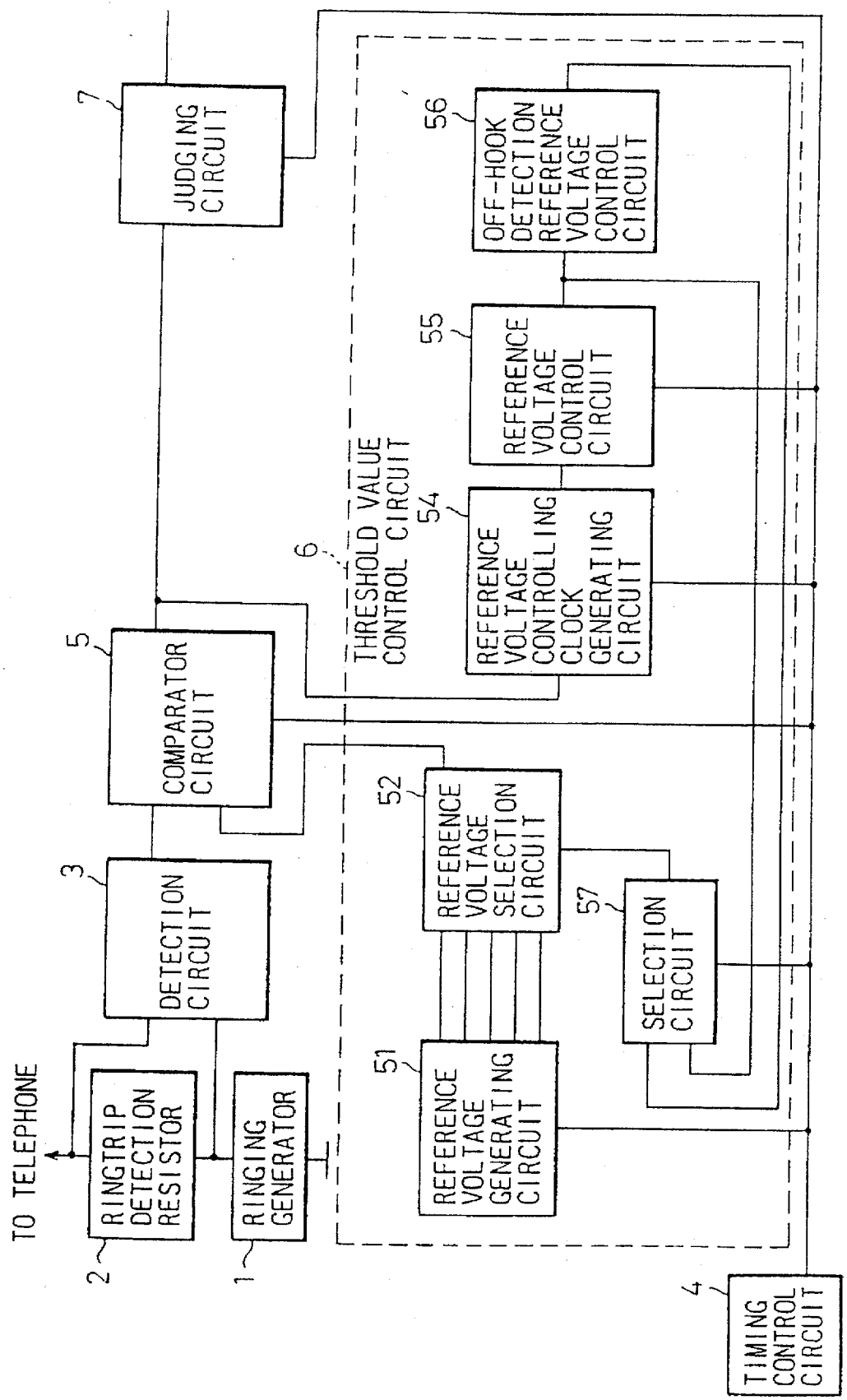
FIG. 8 is a block diagram showing a first embodiment of the present invention.

FIG. 8 is a diagram showing a first example of the configuration of the threshold value control circuit 6 shown in FIG. 7, wherein the same parts as those shown in FIG. 7 are designated by the same reference numerals. In the threshold value control circuit 6, reference numeral 51 is a reference voltage generating circuit for outputting a plurality of reference voltages of different fixed values, and 52 is a reference voltage selection circuit for selecting and outputting one of the plurality of reference voltages from the reference voltage generating circuit 51 in accordance with a control signal.

Further, reference numeral 54 is a reference voltage controlling clock generating circuit which, under the control of the timing control circuit 4, outputs a change request signal as a clock signal requesting the reference voltage be changed by one step, each time the comparator circuit 5 determines that the output voltage of the detection circuit 3 is greater than the reference voltage from the reference voltage selection circuit 52, during the input period of the second ringing wave. Reference numeral 55 is a reference voltage control circuit which outputs a control signal for having the reference voltage selection circuit 52 send to the comparator circuit 5 the reference voltage selected in accordance with the change request signal.

Reference numeral 56 is an off-hook detection reference voltage control circuit which, based on the control output of the reference voltage control circuit 55, outputs a control signal for having the reference voltage selection circuit 52 select the reference voltage corresponding to the threshold value suitable for off-hook detection. Reference numeral 57 is a selection circuit which, under the control of the timing control circuit 4, selects the control output of the reference voltage control circuit 55 until the input of the second ringing wave is completed, and the control output of the off-hook detection reference voltage control circuit 56 after the input of the second ringing wave is completed, as an input to the reference voltage selection circuit 52.

When a call occurs, ringing signal transmission to the called telephone is initiated and a voltage proportional to the ringing current appears across the ringtrip detection resistor 2. The detection circuit 3 detects this voltage. Under the control of the timing control circuit 4, the threshold value control circuit 6 and the judging circuit 7 are initialized immediately after the initiation of the ringing signal transmission. With the initialization of the threshold value control circuit 6, the control output of the reference voltage control circuit 55 is initialized so that the reference voltage selection circuit 52 selects the lowest of the reference voltages.

Under the control of the timing control circuit 4, the reference voltage control circuit 55 in the threshold value control circuit 6 performs an operation to have the reference voltage selection circuit 52 select a one-level higher reference voltage each time the detected voltage from the detection circuit 3 exceeds the reference voltage selected by the reference voltage selection circuit 52 when they are compared in the comparator circuit 5 during the input period of the second wave of the ringing current after the initiation of the ringing signal transmission. By repeating this operation, the lowest reference voltage is selected as the threshold value from among the reference voltages exceeding the peak value of the detected voltage on the second wave of the ringing current after the ringing signal transmission.

The off-hook detection reference voltage control circuit 56 in the threshold value control circuit 6 determines the reference voltage used as the threshold voltage for off-hook detection in accordance with the control output of the reference voltage control circuit 55, and produces an output for having that reference voltage selected. At the end of the input of the second wave after the ringing signal transmission, control of the reference voltage selection circuit 52 is immediately switched from the reference voltage control circuit 55 to the off-hook detection reference voltage control circuit 56 in accordance with the control from the timing control circuit 4. The reference voltage selection circuit 52, now under the control of the off-hook detection reference voltage control circuit 56, supplies the reference voltage suitable as the threshold value for off-hook detection to the comparator circuit 5, upon which the off-hook monitoring operation is started.

After the off-hook detection threshold voltage has been set for the comparator circuit 5, if the occurrence of an output voltage exceeding this threshold voltage is detected in the detection circuit 3, the situation is interpreted as the detection of an off-hook condition, upon which a prescribed judging process is initiated in the judging circuit 7.

Figure 9:
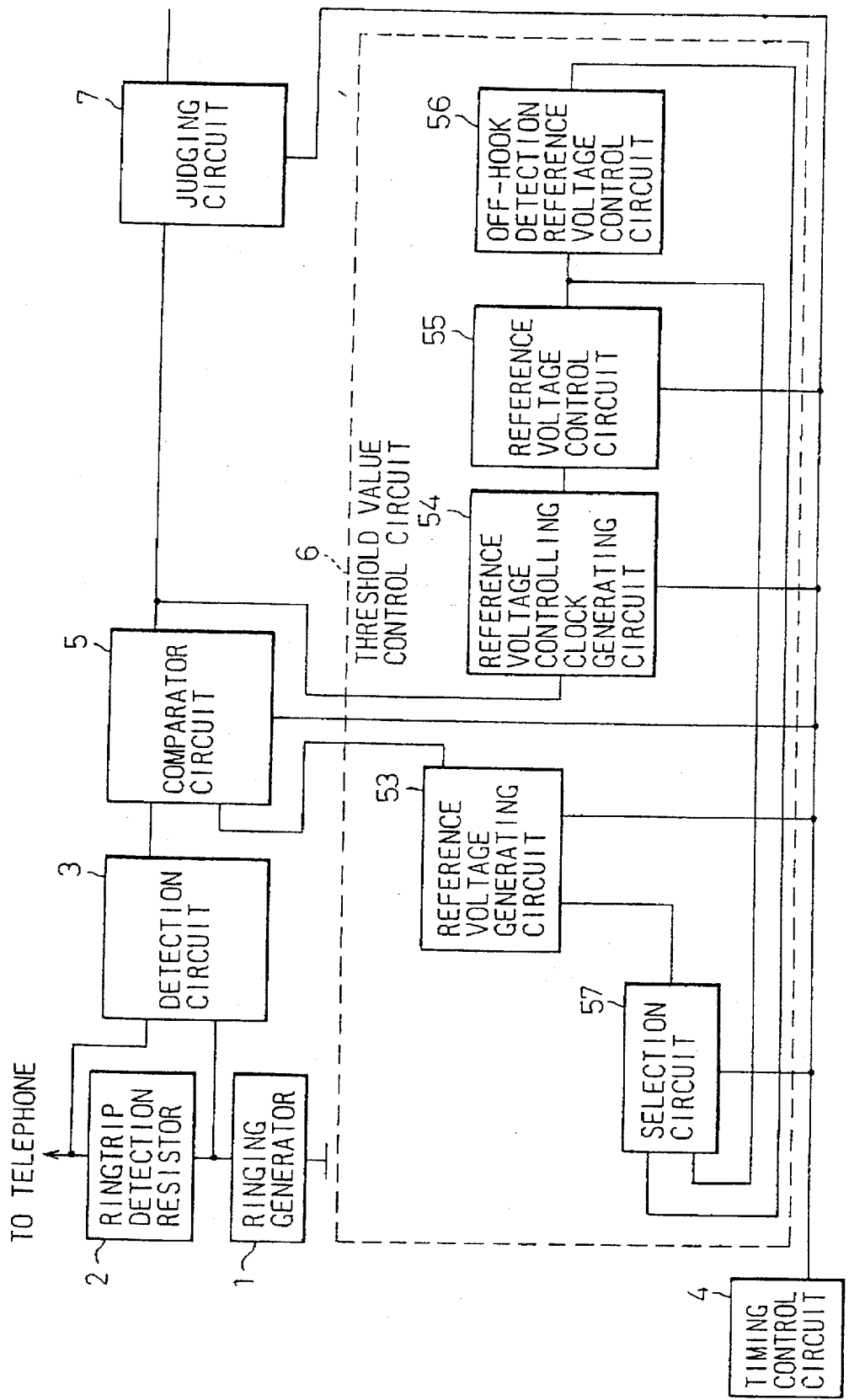
FIG. 9 is a block diagram showing a second embodiment of the present invention.

FIG. 9 is a diagram showing a second example of the configuration of the threshold value control circuit 6 shown in FIG. 7, wherein the same parts as those shown in FIG. 7 are designated by the same reference numerals. In the threshold value control circuit 6, reference numeral 53 is a reference voltage generating circuit for generating and outputting one of a plurality of reference voltages, and 54 is a reference voltage controlling clock generating circuit which, under the control of the timing control circuit 4, outputs a change request signal as a clock signal requesting the reference voltage be changed by one step each time the comparator circuit 5 determines that the output voltage of the detection circuit 3 is greater than the reference voltage from the reference voltage generating circuit 53, during the input period of the second ringing wave.

Further, reference numeral 55 is a reference voltage control circuit which outputs a control signal for having the reference voltage generating circuit 53 send to the comparator circuit 5 the reference voltage generated in accordance with the change request signal; 56 is an off-hook detection reference voltage control circuit which, in accordance with the control output of the reference voltage control circuit 55, outputs a control signal for having the reference voltage generating circuit 53 output a reference voltage corresponding to the threshold value for off-hook detection; and 57 is a selection circuit which, under the control of the timing control circuit 4, selects the control output of the reference voltage control circuit 55 until the input of the second ringing wave is completed, and the control output of the off-hook detection reference voltage control circuit 56 after the input of the second ringing wave is completed, as an input to the reference voltage generating circuit 53.

When a call occurs, ringing signal transmission to the called telephone is initiated and a voltage proportional to the ringing current appears across the ringtrip detection resistor 2. The detection circuit 3 detects this voltage. Under the control of the timing control circuit 4, the threshold value control circuit 6 and the judging circuit 7 are initialized immediately after the initiation of the ringing signal transmission. With the initialization of the threshold value control circuit 6, the control output of the reference voltage control circuit 55 is initialized so that the reference voltage generating circuit 53 outputs the lowest of the reference voltages.

Under the control of the timing control circuit 4, and with the input timing of the second wave of the ringing current after the initiation of ringing signal transmission, the reference voltage control circuit 55 in the threshold value control circuit 6 performs an operation to have the reference voltage generating circuit 53 output a one-level higher reference voltage each time the detected voltage from the detection circuit 3 exceeds the reference voltage output from the reference voltage generating circuit 53 when they are compared in the comparator circuit 5. By repeating this operation, the lowest reference voltage is set as the threshold value out of the reference voltages exceeding the peak value of the detected voltage on the second wave of the ringing current after the ringing signal transmission.

The off-hook detection reference voltage control circuit 56 in the threshold value control circuit 6 determines the reference voltage used as the threshold voltage for off-hook detection in accordance with the control output of the reference voltage control circuit 55, and produces an output for selecting that reference voltage. At the end of the input of the second wave after the ringing signal transmission, control of the reference voltage generating circuit 53 is immediately switched from the reference voltage control circuit 55 to the off-hook detection reference voltage control circuit 56 in accordance with the control from the timing control circuit 4. The reference voltage generating circuit 53, under the control of the off-hook detection reference voltage control circuit 56, supplies the reference voltage suitable as the threshold value for off-hook detection to the comparator circuit 5, upon which the off-hook monitoring operation is started.

After the off-hook detection threshold voltage has been set for the comparator circuit 5, if the occurrence of an output voltage exceeding this threshold voltage is detected in the detection circuit 3, the situation is interpreted as the detection of an off-hook condition, upon which a prescribed judging process is initiated in the judging circuit 7.

Figure 10:
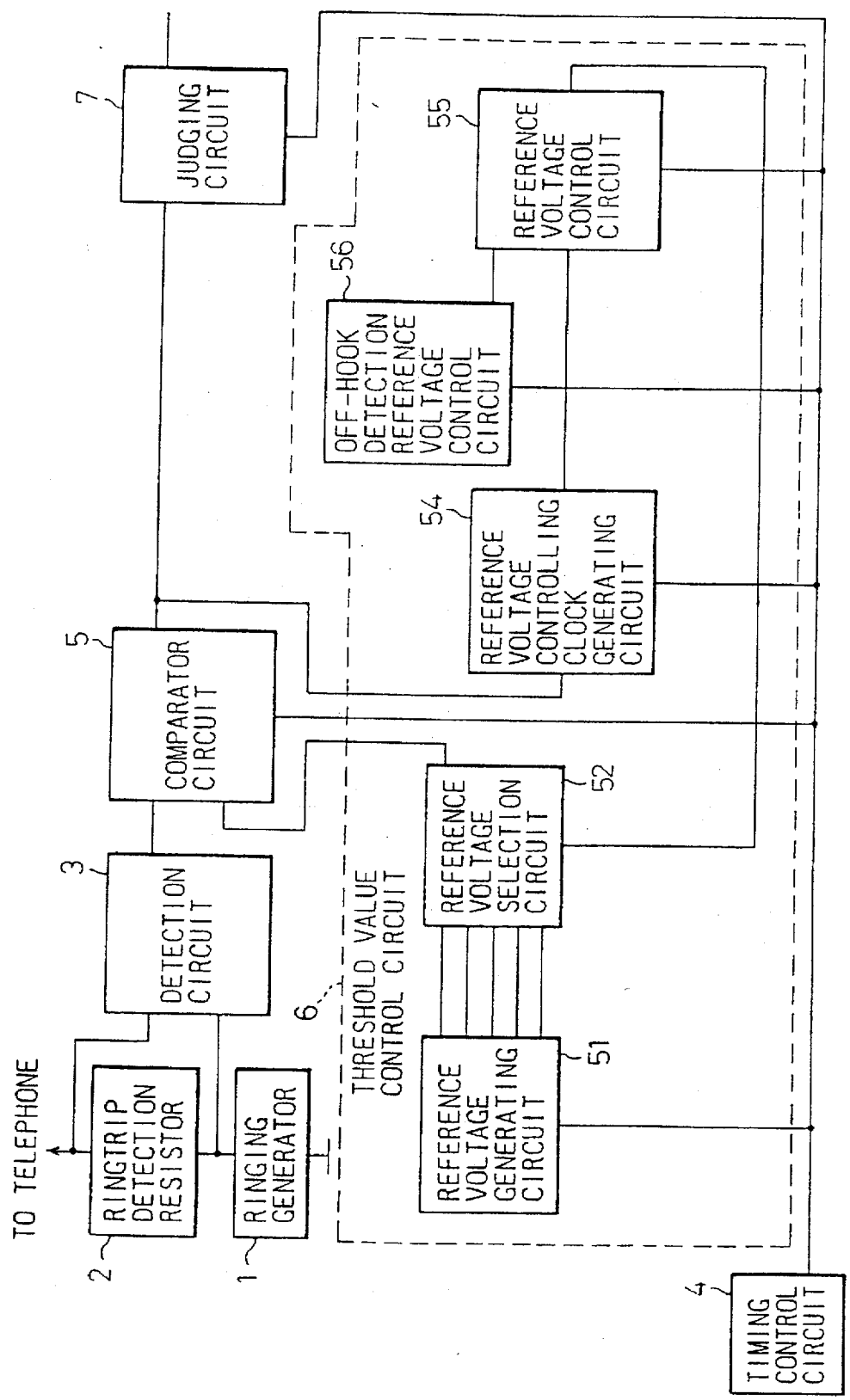
FIG. 10 is a block diagram showing a third embodiment of the present invention.

FIG. 10 is a diagram showing a third example of the configuration of the threshold value control circuit 6 shown in FIG. 7, wherein the same parts as those shown in FIG. 7 are designated by the same reference 10 numerals. In the threshold value control circuit 6, reference numeral 51 is a reference voltage generating circuit for outputting a plurality of reference voltages of different fixed values; 52 is a reference voltage selection circuit for selecting and outputting one of the plurality of reference voltages supplied from the reference voltage generating circuit 51; and 54 is a reference voltage controlling clock generating circuit which, under the control of the timing control circuit 4, outputs a change request signal as a clock signal requesting the reference voltage be changed by one step each time the comparator circuit 5 determines that the output voltage of the detection circuit 3 is greater than the reference voltage from the reference voltage selection circuit 52, during the input period of the second ringing wave.

Further, reference numeral 55 is a reference voltage control circuit which outputs a control signal for having the reference voltage selection circuit 52 send to the comparator circuit 5 the reference voltage selected in accordance with the change request signal, and 56 is an off-hook detection reference voltage control circuit which outputs to the reference voltage control circuit 55 a change request signal as a clock signal requesting the reference voltage be changed so that the reference voltage selection circuit 52 is made to select the reference voltage corresponding to the threshold value suitable for off-hook detection.

When a call occurs, ringing signal transmission to the called telephone is initiated and a voltage proportional to the ringing current appears across the ringtrip detection resistor 2. The detection circuit 3 detects this voltage. Under the control of the timing control circuit 4, the threshold value control circuit 6 and the judging circuit 7 are initialized immediately after the initiation of the ringing signal transmission. With the initialization of the threshold value control circuit 6, the control output of the reference voltage control circuit 55 is initialized so that the reference voltage selection circuit 52 selects the lowest of the reference voltages.

Under the control of the timing control circuit 4, and with the input timing of the second wave of the ringing current after the initiation of ringing signal transmission, the reference voltage control circuit 55 in the threshold value control circuit 6 performs an operation to have the reference voltage selection circuit 52 select a one-level higher reference voltage each time the detected voltage from the detection circuit 3 exceeds the reference voltage selected by the reference voltage selection circuit 52 when they are compared in the comparator circuit 5. By repeating this operation, the lowest reference voltage is selected as the threshold value from among the reference voltages exceeding the peak value of the detected voltage on the second wave of the ringing current after the ringing signal transmission.

The off-hook detection reference voltage control circuit 56 in the threshold value control circuit 6, under the control of the timing control circuit 4, supplies the reference voltage control circuit 55 with a clock pulse for raising the voltage from the currently set reference voltage to the off-hook detection reference voltage, upon completion of the input of the second wave after the ringing signal transmission. In response to this clock pulse, the reference voltage control circuit 55 has the reference voltage selection circuit 52 supply the reference voltage suitable as the threshold value for off-hook detection to the comparator circuit 5, upon which the off-hook monitoring operation is started.

After the off-hook detection threshold voltage has been set for the comparator circuit 5, if the occurrence of an output voltage exceeding this threshold voltage is detected in the detection circuit 3, the situation is interpreted as the detection of an off-hook condition, upon which a prescribed judging process is initiated in the judging circuit 7.

Figure 11:
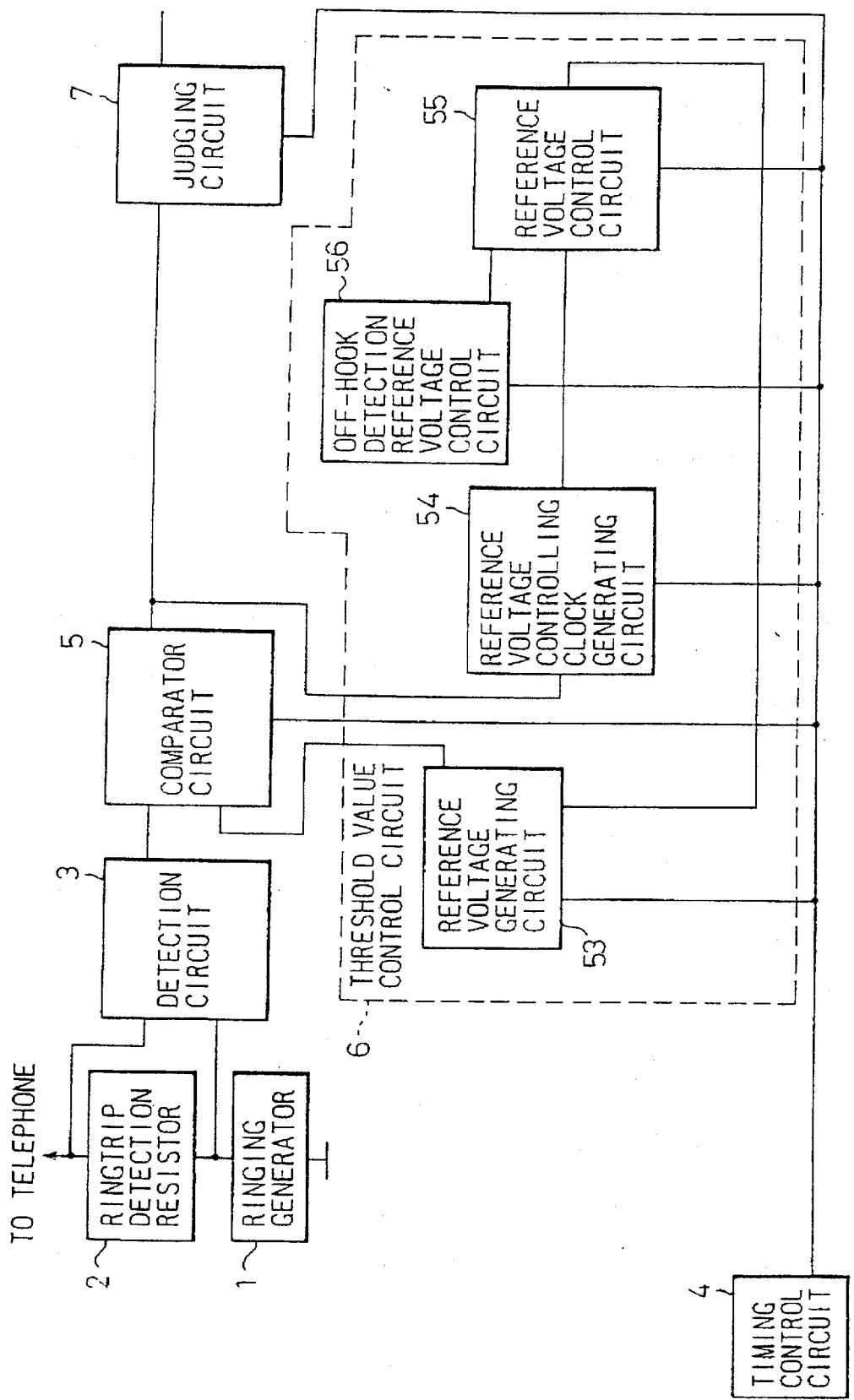
FIG. 11 is a block diagram showing a fourth embodiment of the present invention.

FIG. 11 is a diagram showing a fourth example of the configuration of the threshold value control circuit 6 shown in FIG. 7, wherein the same parts as those shown in FIG. 7 are designated by the same reference numerals. In the threshold value control circuit 6, a reference voltage generating circuit 53 generates and outputs one of a plurality of reference voltages. Reference numeral 54 is a reference voltage controlling clock generating circuit which, under the control of the timing control circuit 4, outputs a change request signal as a clock signal requesting the reference voltage be changed by one step each time the comparator circuit 5 determines that the output voltage of the detection circuit 3 is greater than the reference voltage from the reference voltage generating circuit 53, during the input period of the second ringing wave.

Further, reference numeral 55 is a reference voltage control circuit which outputs a control signal for having the reference voltage generating circuit 53 send to the comparator circuit 5 the reference voltage generated in accordance with the change request signal, and 56 is an off-hook detection reference voltage control circuit which outputs to the reference voltage control circuit 55 a signal requesting the reference voltage be changed so that the reference voltage corresponding to the threshold value suitable for off-hook detection is output from the reference voltage generating circuit 53.

When a call arises, ringing signal transmission to the called telephone is initiated and a voltage proportional to the ringing current appears across the ringtrip detection resistor 2. The detection circuit 3 detects this voltage. Under the control of the timing control circuit 4, the threshold value control circuit 6 and the judging circuit 7 are initialized immediately after the initiation of the ringing signal transmission. With the initialization of the threshold value control circuit 6, the control output of the reference voltage control circuit 55 is initialized so that the reference voltage generating circuit 53 outputs the lowest of the reference voltages.

Under the control of the timing control circuit 4, and with the input timing of the second wave of the ringing current after the initiation of ringing signal transmission, the reference voltage control circuit 55 in the threshold value control circuit 6 performs an operation to have the reference voltage generating circuit 53 output a one-level higher reference voltage each time the detected voltage from the detection circuit 3 exceeds the reference voltage output from the reference voltage generating circuit 53 when they are compared in the comparator circuit 5. By repeating this operation, the lowest reference voltage is set as the threshold value out of the reference voltages exceeding the peak value of the detected voltage on the second wave of the ringing current after the ringing signal transmission.

The off-hook detection reference voltage control circuit 56 in the threshold value control circuit 6, under the control of the timing control circuit 4, supplies the reference voltage control circuit 55 with a clock pulse for raising the voltage from the currently set reference voltage to the off-hook detection reference voltage, upon completion of the input of the second wave after the ringing signal transmission. In response to this clock pulse, the reference voltage control circuit 55 has the reference voltage generating circuit 53 supply the reference voltage suitable as the threshold value for off-hook detection to the comparator circuit 5, upon which the off-hook monitoring operation is started.

After the off-hook detection threshold voltage has been set for the comparator circuit 5, if the occurrence of an output voltage exceeding this threshold voltage is detected in the detection circuit 3, the situation is interpreted as the detection of an off-hook condition, upon which a prescribed judging process is initiated in the judging circuit 7.

Figure 12:
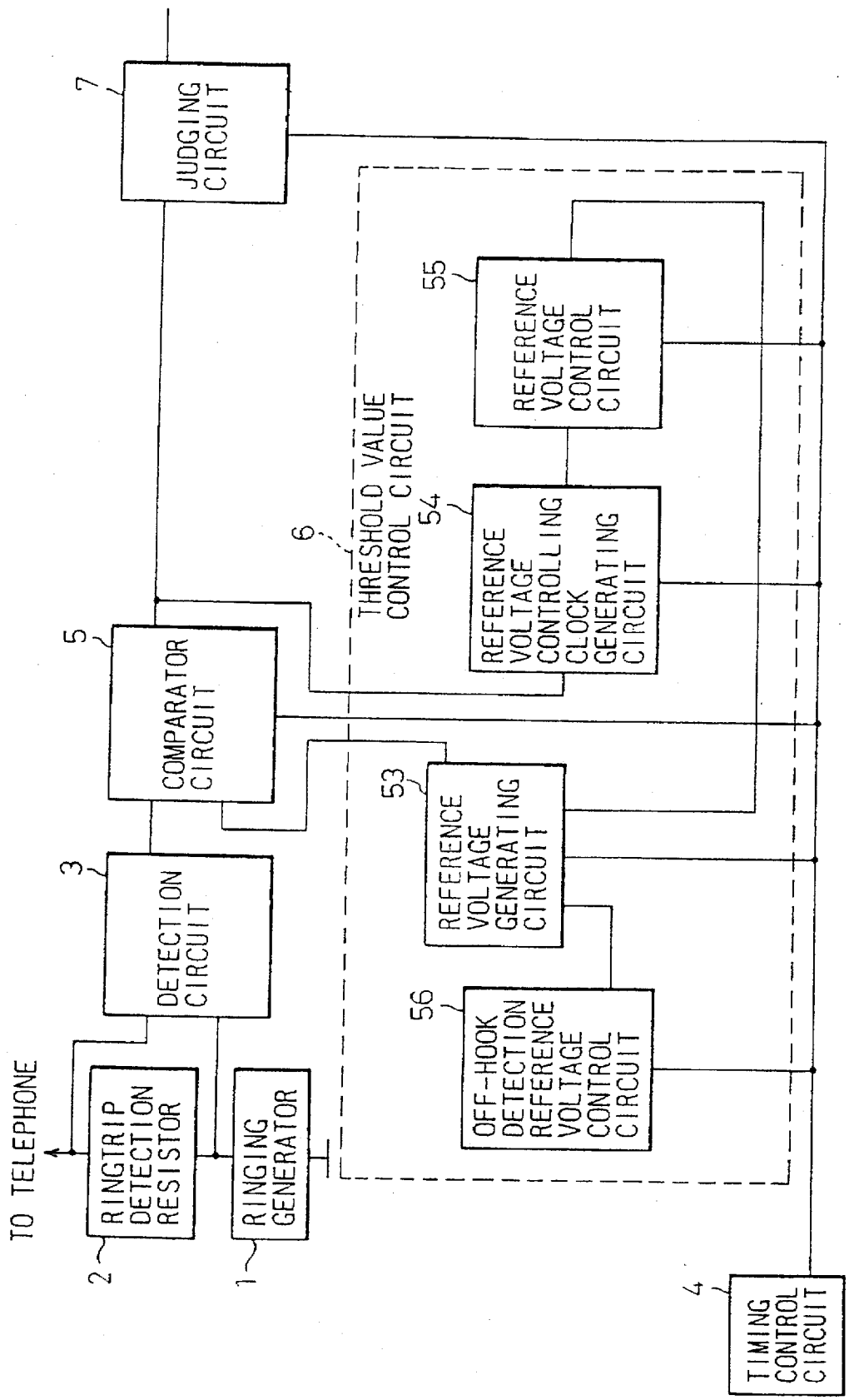
FIG. 12 is a block diagram showing a fifth embodiment of the present invention.

FIG. 12 is a diagram showing a fifth example of the configuration of the threshold value control circuit 6 shown in FIG. 7, wherein the same parts as those shown in FIG. 7 are designated by the same reference numerals. In the threshold value control circuit 6, reference numeral 53 is a reference voltage generating circuit for generating and outputting one of a plurality of reference voltages, and 54 is a reference voltage controlling clock generating circuit which, under the control of the timing control circuit 4, outputs a change request signal as a clock signal requesting the reference voltage be changed by one step each time the comparator circuit 5 determines that the output voltage of the detection circuit 3 is greater than the reference voltage from the reference voltage generating circuit 53, during the input period of the second ringing wave.

Further, reference numeral 56 is an off-hook detection reference voltage control circuit which, under the control of the timing control circuit 4, controls the reference generating circuit 53 to add a difference voltage and thereby output the reference voltage corresponding to the threshold value for off-hook detection upon completion of the input of the second ringing wave. Reference numeral 55 is a reference voltage control circuit which controls the reference voltage generating circuit 53 to send the appropriate reference voltage to the comparator circuit 5.

When a call arises, ringing signal transmission to the called telephone is initiated and a voltage proportional to the ringing current appears across the ringtrip detection resistor 2. The detection circuit 3 detects this voltage. Under the control of the timing control circuit 4, the threshold value control circuit 6 and the judging circuit 7 are initialized immediately after the initiation of the ringing signal transmission. With the initialization of the threshold value control circuit 6, the control output of the reference voltage control circuit 55 is initialized so that the reference voltage generating circuit 53 outputs the lowest of the reference voltages.

Under the control of the timing control circuit 4, and with the input timing of the second wave of the ringing current after the initiation of ringing signal transmission, the reference voltage control circuit 55 in the threshold value control circuit 6 performs an operation to have the reference voltage generating circuit 53 output a one-level higher reference voltage each time the detected voltage from the detection circuit 3 exceeds the reference voltage output from the reference voltage generating circuit 53 when they are compared in the comparator circuit 5. By repeating this operation, the lowest reference voltage is set as the threshold value out of the reference voltages exceeding the peak value of the detected voltage on the second wave of the ringing current after the ringing signal transmission.

The off-hook detection reference voltage control circuit 56 in the threshold value control circuit 6, under the control of the timing control circuit 4, controls the reference voltage generating circuit 53 to add the difference voltage to raise the currently set reference voltage to the off-hook detection reference voltage upon completion of the input of the second wave after the ringing signal transmission. In response, the reference voltage generating circuit 53 supplies the reference voltage suitable as the threshold value for off-hook detection to the comparator circuit 5, upon which the off-hook monitoring operation is started.

After the off-hook detection threshold voltage has been set for the comparator circuit 5, if the occurrence of an output voltage exceeding this threshold voltage is detected in the detection circuit 3, the situation is interpreted as the detection of an off-hook condition, upon which a prescribed judging process is initiated in the judging circuit 7.

FIGS. 13 to 17 show the details of the circuits shown in FIGS. 8 to 12, respectively, wherein the same parts as those shown in the corresponding figures are designated by the same reference numerals.

In each of FIGS. 13 to 17, the timing control circuit 4 comprises cascaded flip-flops D-FF1 to D-FF3, to which a ringer activation signal RNG is applied as an input and a ringing signal RT is applied as a clock pulse train for operation. A NAND circuit NAD1 accepts the signal RNG and a complementary logic output $\overline{Q}$ of the flip-flop D-FF1 at its inputs and produces a signal CLR for initializing the threshold value control circuit 6 and the judging circuit 7; an AND circuit AD1 accepts the signal RT and a complementary logic output $\overline{Q}$ of the flip-flop D-FF2 at its inputs and produces a control signal G for determining the reference voltage that is output at the start of ringing; the flip-flop D-FF2 outputs at its Q output a control signal S for switching from the threshold voltage at the start of ringing to the threshold voltage for off-hook detection; and the flip-flop D-FF3 outputs at its Q output a signal for controlling the activation of the judging circuit 7. The comparator circuit 5 is constructed from a comparator CMP1.

Figure 13:
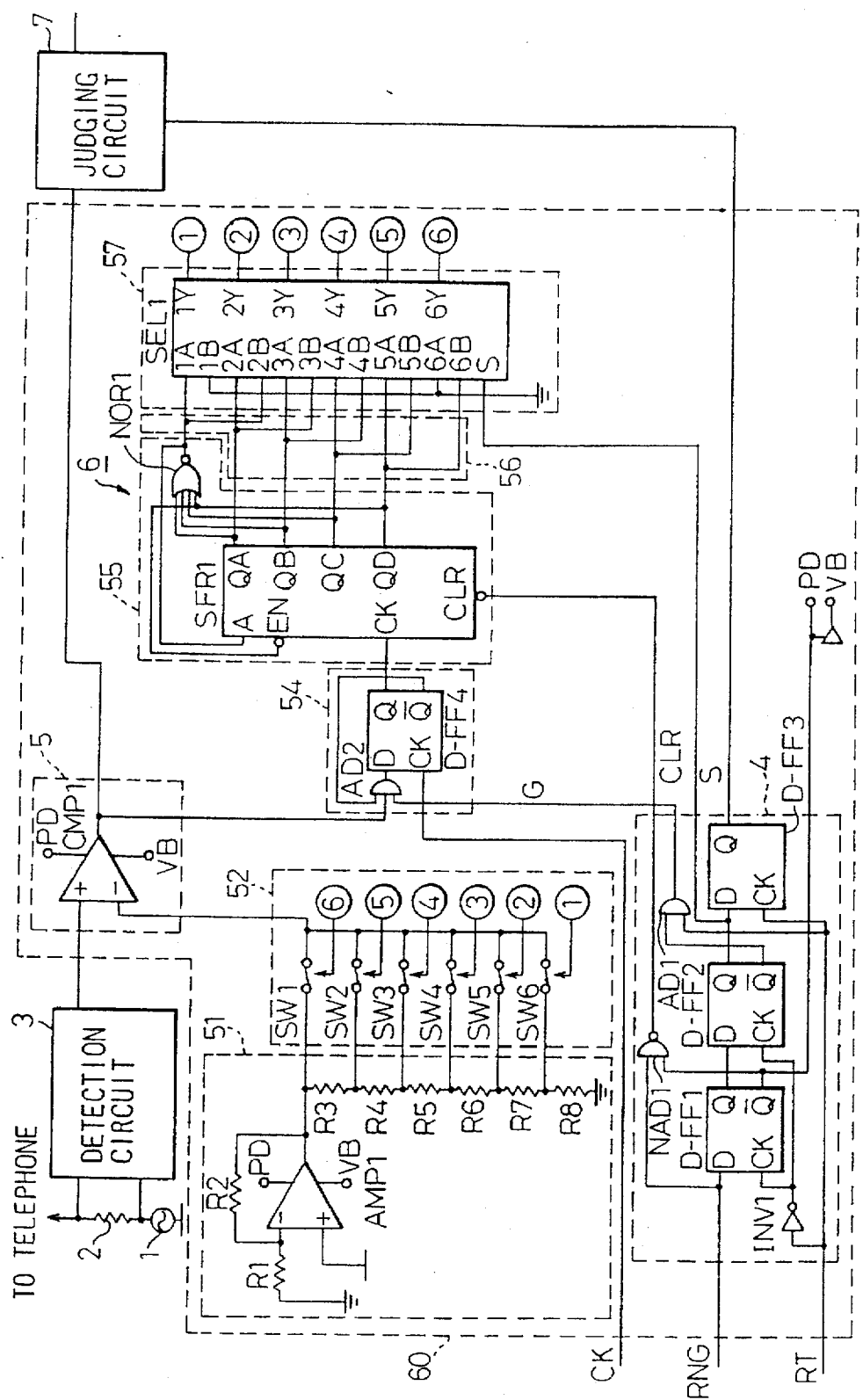
FIG. 13 is a circuit diagram showing the details of the circuit of FIG. 8.
Figure 14:
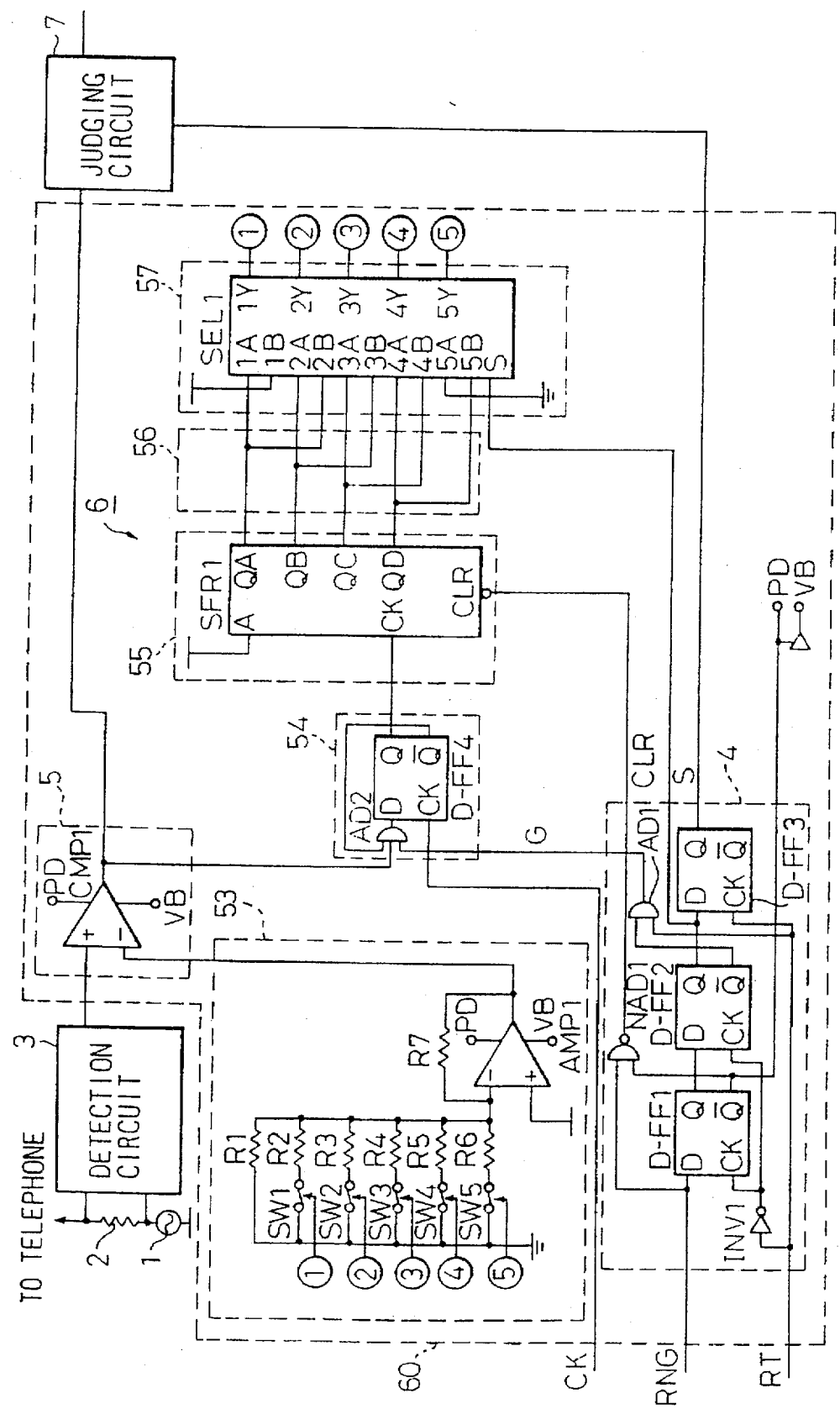
FIG. 14 is a circuit diagram showing the details of the circuit of FIG. 9.
Figure 15:
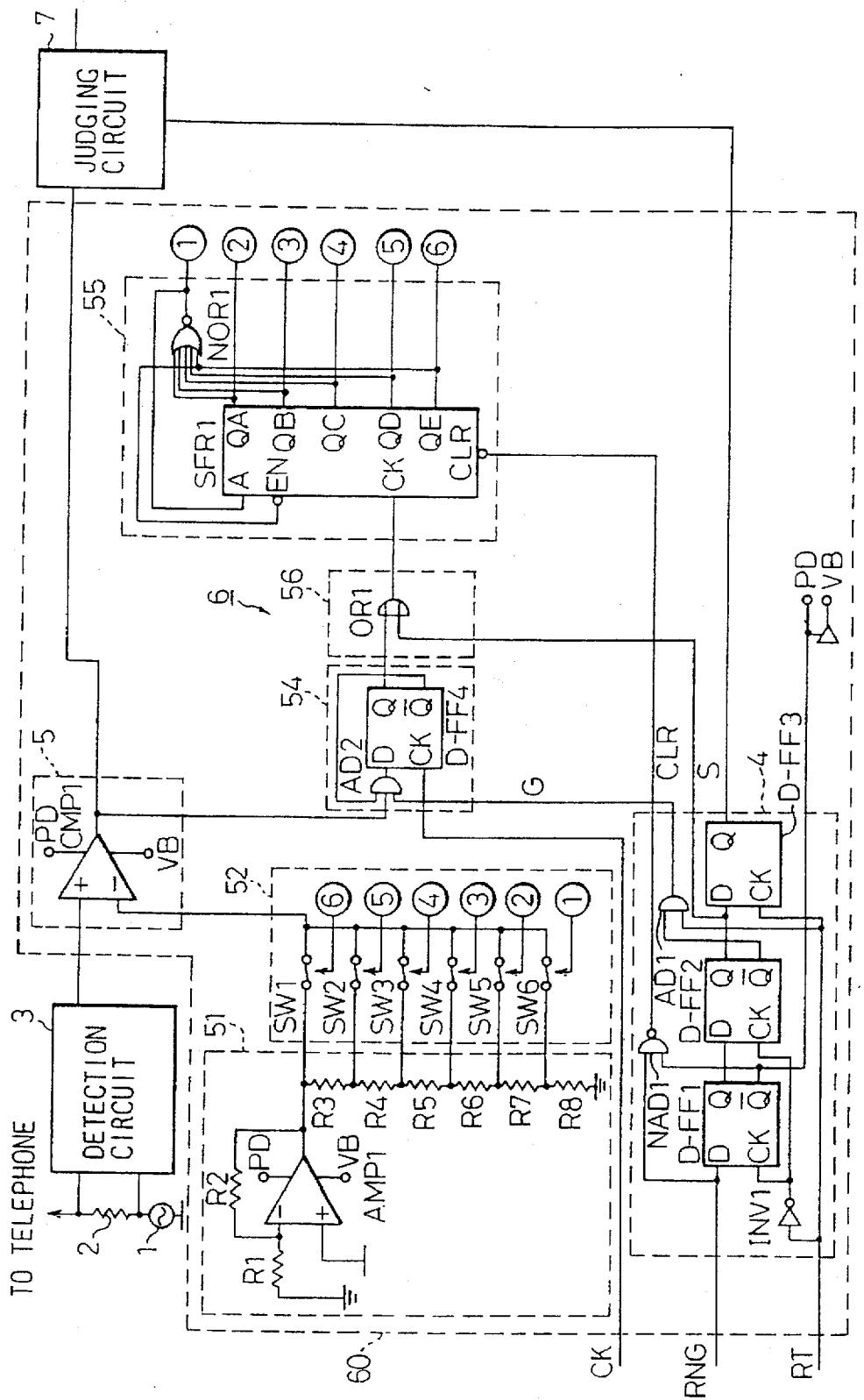
FIG. 15 is a circuit diagram showing the details of the circuit of FIG. 10.
Figure 16:
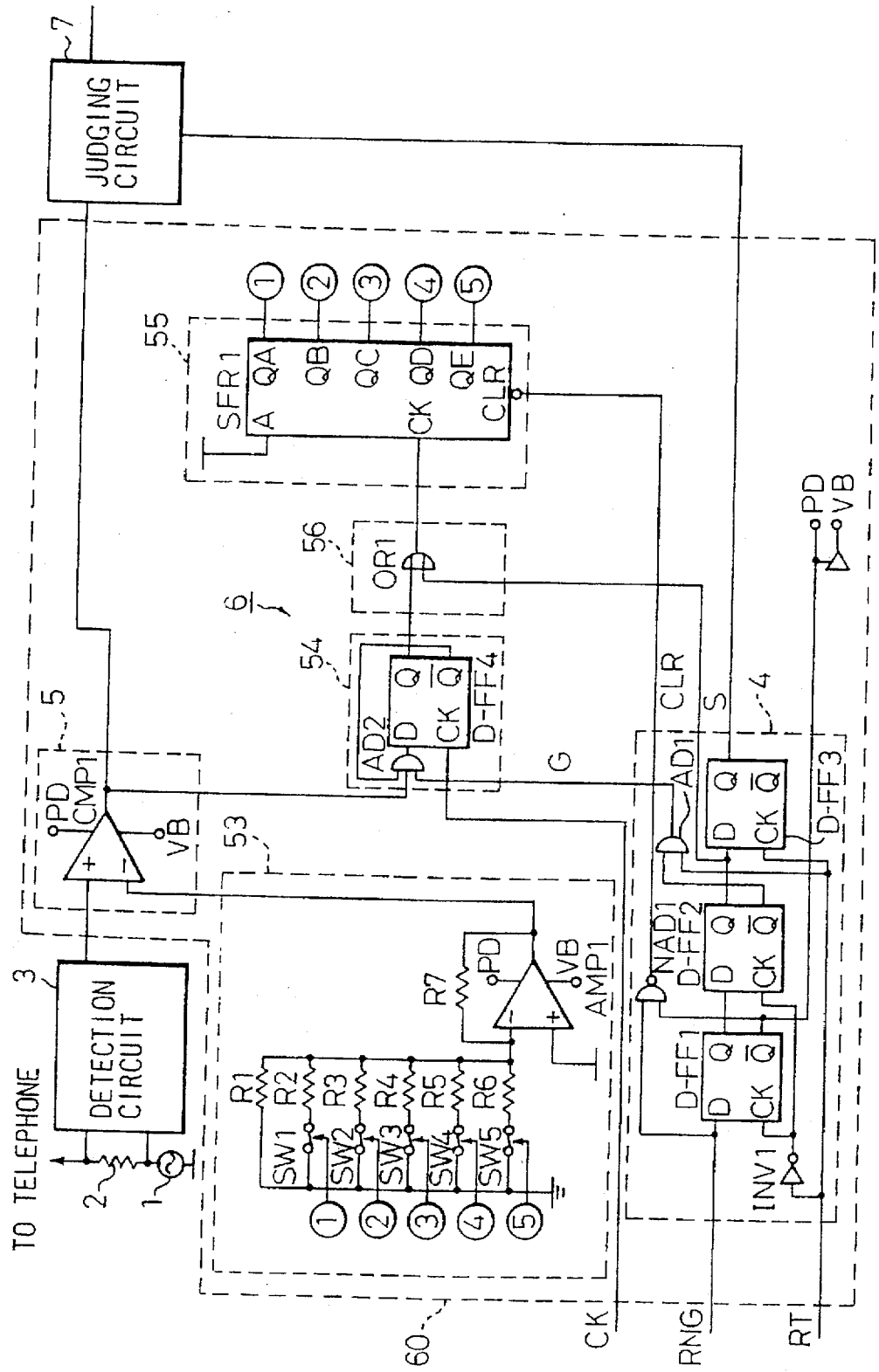
FIG. 16 is a circuit diagram showing the details of the circuit of FIG. 11.
Figure 17:
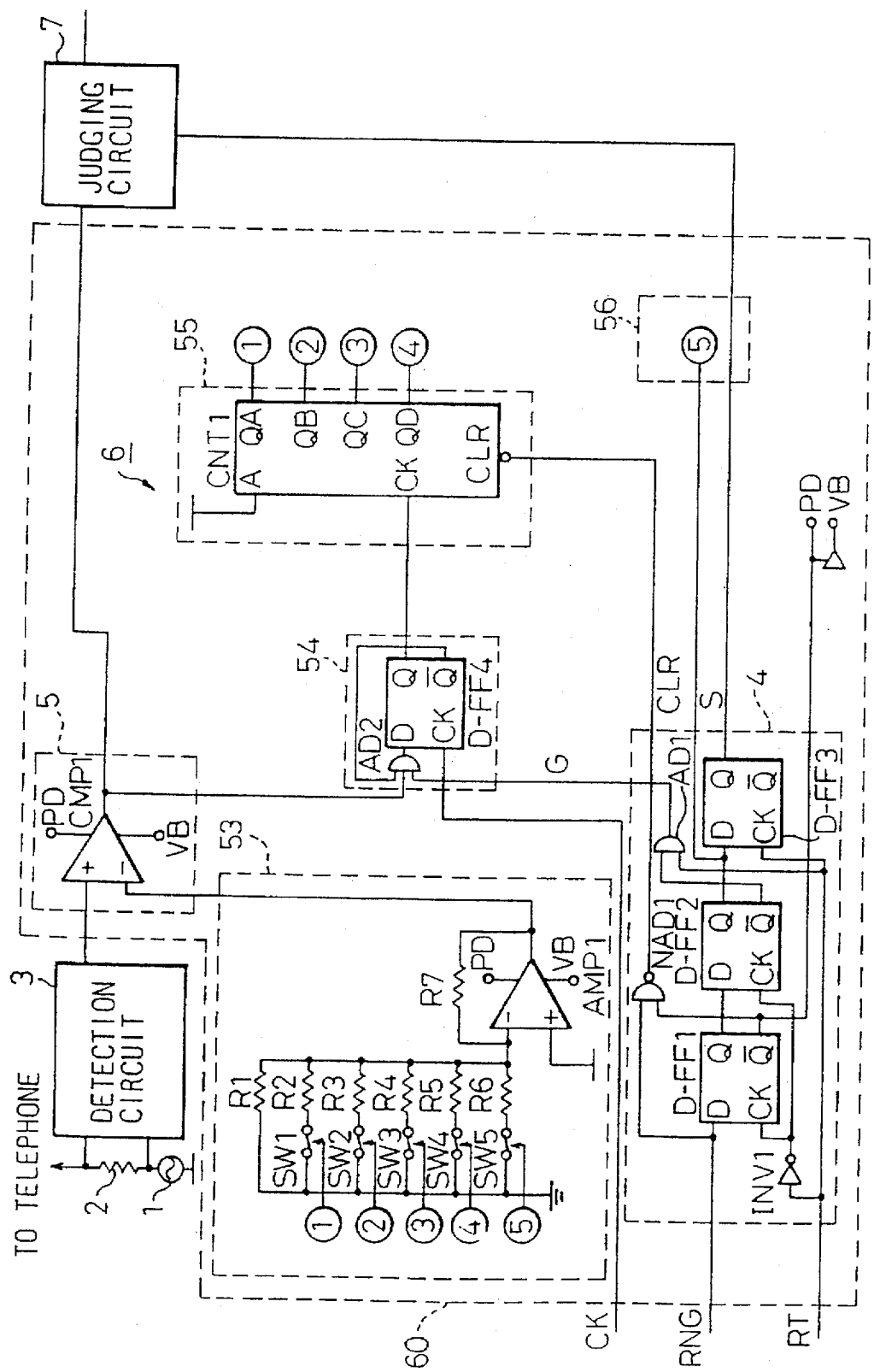
FIG. 17 is a circuit diagram showing the details of the circuit of FIG. 12.

In FIGS. 13 and 15, the reference voltage generating circuit 51 comprises an amplifier AMP1 for generating a constant voltage which is determined by the ratio of resistors R1 and R2, and a chain of resistors R3 to R8 for dividing the output of the amplifier AMP1 and thereby obtaining six different reference voltages. The reference voltage selection circuit 52 comprises switches SW1 to SW6 for selecting for output the respective reference voltages Vth1 to Vth6 obtained through the resistors R3 to R8. In FIGS. 14, 16, and 17, the reference voltage generating circuit 53 comprises an amplifier AMP1 as a summing amplifier having a feedback resistor R7, whose output is a function of the ratio of the feedback resistor R7 to a resistor R1 combined with resistors R2–R6 that are connected or disconnected by switches SW1–SW5, the combination being appropriately determined to select and generate one of the reference voltages Vth1–Vth6. Power supply to the amplifier AMP1 and the comparator CMP1 is controlled by signals PD and VB derived from the complementary logic output $\overline{Q}$ of the flip-flop D-FF1. As a result, the comparator CMP1 starts the voltage comparison operation not at the first wave of ringing but at the second wave.

In FIGS. 13 to 17, the reference voltage controlling clock generating circuit 54 comprises an AND circuit AD2 and a flip-flop D-FF4, and when the ringing is started, outputs a clock CK each time the comparator circuit 5 determines that the output voltage from the detection circuit 3 is greater than the reference voltage from the reference voltage selection circuit 52 or the reference voltage generating circuit 53, during the input period of the second ringing wave.

In FIGS. 13 and 15, the reference voltage control circuit 55 comprises a shift register SFR1 and a NOR circuit NOR1. In synchronism with an input at a clock CK, the shift register SFR1 shifts a value applied to an input A in the order QA→QB→QC→QD→QE for output. The outputs, QA, QB, ..., of the shift register are connected to the NOR circuit NOR1 whose output is connected to the input A of the shift register; therefore, when all the outputs are "0", a "1" is input, and when any one of the outputs is "1", a "0" is input. As a result, the outputs, QA, QB, QC, ..., of the shift register change from 0, 0, 0, ... to 1, 0, 0, ... to 0, 1, 0, . . . to 0, 0, 1, ... with each clock input. To an enable input EN of the shift register is connected the output QD in FIG. 13, and the output QE in FIG. 15. Therefore, once the output QD or QE is set to "1", there occurs no change in the outputs even if a clock pulse is input from the flip-flop D-FF4.

In FIGS. 14 and 16, the reference voltage control circuit 55 comprises a shift register SFR1 whose input A is fixed to "1". Therefore, its outputs, QA, QB, QC, ..., change from 0, 0, 0, ... to 1, 0, 0, ... to 1, 1, 0, ..., to 1, 1, 1, ... with each clock input.

In FIG. 17, the reference voltage control circuit 55 comprises a counter CNT1. Its outputs, QA, QB, QC, QD, therefore change from 0, 0, 0, 0, to 1, 0, 0, 0 to 0, 1, 0, 0 to 1, 1, 0, 0 in this order with each clock input.

In FIGS. 13 and 14, the selection circuit 57 comprises a selector SEL1, which, in accordance with the control signal S, selects inputs nA (n=1,2, ... ) from the reference voltage control circuit 55 or inputs nB from the off-hook detection reference voltage control circuit 56 for output. In the off-hook detection reference voltage control circuit 56 shown in FIGS. 13 and 14, connections are made so that the values supplied to the inputs nA are also supplied to (n+1)B. Therefore, when the inputs on the B side are selected in the selector SEL1, a control signal is output for selecting a value one step higher than the value selected when the inputs on the A side were selected. In FIGS. 15 and 16, the off-hook detection reference voltage control circuit 56 comprises an OR circuit OR1, which performs a function, by the Q output of the D-FF2 in the timing control circuit 4, to cause a shift in the shift register SFR1 and thereby select a value one step higher. In the circuit shown in FIG. 17, a value one step higher is selected by energizing SW5 in the reference voltage generating circuit 53 by the Q output of the D-FF2.

FIG. 18 is a timing chart for the various signals in the ringtrip judging circuit shown in FIGS. 13 and 15; the symbols shown in the figure correspond to the symbols shown in FIGS. 13 and 15. The timing chart for the circuit of FIGS. 14, 16, and 17 is shown in FIG. 19, the only difference from FIG. 18 being in the shift register outputs QA, QB, QC, . . .

In FIGS. 18 and 19, D-FF1Q to D-FF3Q represent the Q outputs of the D-FF1 to D-FF3 in the timing control circuit 4, while D-FF4Q represents the Q output of the D-FF4 in the reference voltage controlling clock generating circuit 54. Likewise, SFRQA to SFRQD denote the QA to QD outputs of the shift register SFR1 in the reference voltage control circuit 55. "Judging circuit output" shows the output of the judging circuit 7; to prevent erroneous detection, only when the ringing current has exceeded the off-hook detection threshold value for two successive cycles of the detection voltage signal, does the judging circuit 7 determine that the called party has answered the call and produce an output signifying the answer condition.

In the circuit shown in FIG. 13, when the ringer activation signal RNG occurs, the timing control circuit 4 outputs a control signal CLR by which the shift register SFR1 in the reference voltage control circuit 55 is cleared. Initially, the selector SEL1 in the selection circuit 57 selects the inputs on the A side, and all the outputs of the shift register SFR1 are at a low level; therefore, by the output of the NAND circuit NAD2, in the selector SEL1 only the output (1) is set to a high level, and in the reference voltage selection circuit 52 only the switch SW6 is energized so that the lowest reference voltage Vth6 is output.

In the first wave period of the sinusoidally varying ringing current, the power supply to the comparator CMP1 and amplifier AMP1 is off, as previously noted. At the second wave of the ringing current, the control signal G output from the timing control circuit 4 goes high. During the period when the control signal G is high, if the detection voltage from the detection circuit 3 rises above the threshold voltage Vth6, the comparator CMP1 produces a high level output, and with the next operating clock CK timing, the output of the flip-flop D-FF4 goes high. With this signal, a shift occurs in the shift register SFR1, and the threshold voltage is changed to a one-step higher value which is Vth5. In a like manner, the threshold voltage is further raised one step above, that is, to Vth4. Eventually, at the end of the period when the control signal G is high, the lowest threshold voltage among the threshold voltages greater than the detection voltage is set during that period. In the example shown in FIG. 18, since the peak value of the detection voltage during the second wave period is greater than Vth4 but smaller than Vth3, eventually Vth3 is set as the threshold value.

Next, when the control signal S (D-FF2Q) from the timing control circuit 4 goes high, the selector SEL1 is switched to the B side so that a one level higher reference voltage, Vth2, is output as the off-hook detection threshold voltage, upon which the off-hook monitoring operation is started.

Next, by the control signal (D-FF3Q) from the timing control circuit 4, the judging circuit 7 is placed into operation, and in this state, an off-hook condition, i.e., ringtrip, is detected when the detection voltage rises above the threshold voltage. Once the ringtrip condition is determined, the ringer activation signal RNG is stopped, thereby stopping the operation of all circuits other than the timing control circuit 4.

In the circuit shown in FIG. 14, the reference voltage generating circuit 53 forms an adder circuit with the resistors R1 to R6 and the feedback resistor R7 of the amplifier AMP1. In the initial state, the switches SW1-SW5 connected in series with the resistors R2-R6 are all off, so that the output voltage determined by the ratio of the resistors R1 and R7 is supplied as the lowest reference voltage Vth6.

When, with the input timing of the second wave of the ringing current, sequential shifting occurs in the shift register SFR1 in accordance with the result of the comparison in the comparator circuit 5, the switches SW1 to SW3 in the reference voltage generating circuit 53 are sequentially turned on in accordance with the output of the selector SEL1, so that the resistors R2 to R4 are sequentially connected in parallel with the resistor R1, thereby adding respective voltages and thus outputting the reference voltages Vth5 to Vth3 in sequence.

Next, when the control signal S is output and the selector SEL1 is switched to the B side, the switch SW5 is activated to connect the resistor R5, as a result of which a one level higher reference voltage, Vth2, is output as the off-hook detection threshold voltage, upon which the off-hook monitoring operation is started. The operation thereafter is the same as that of the circuit shown in FIG. 13.

In the circuit shown in FIG. 15, in the initial state the outputs of the shift register SFR1 in the reference voltage control circuit 55 are all at a low level; therefore, only the output (1) is set to a high level, and in the reference voltage selection circuit 52, the switch SW6 is energized so that the lowest reference voltage Vth6 is output.

When, with the input timing of the second wave of the ringing current, sequential shifting occurs in the shift register SFR1 in accordance with the result of the comparison in the comparator circuit 5, the outputs (2) to (4) are sequentially set to a high level, and in the reference voltage selection circuit 52 the switches SW5 to SW3 are sequentially turned on, thus outputting the reference voltages Vth5 to Vth3 in sequence.

Next, when the control signal S is output from the timing control circuit 4, a shift occurs in the shift register SFR1 by the operation of the OR circuit OR1 forming the off-hook detection reference voltage controlling clock generating circuit 56; as a result, the output (5) goes high and the switch SW2 is energized so that a one level higher reference voltage, Vth2, is output as the off-hook detection threshold voltage, upon which the off-hook monitoring operation is started. The operation thereafter is the same as that of the circuit shown in FIG. 13.

In the circuit shown in FIG. 16, the configuration of the reference voltage generating circuit 53 is the same as that of the corresponding circuit shown in FIG. 14. Further, the configuration of the off-hook detection reference voltage controlling clock generating circuit 56 is the same as that of the corresponding circuit shown in FIG. 15.

In the circuit shown in FIG. 17, the reference voltage control circuit 55 comprises a counter CNT1. The reference voltage generating circuit 53 forms an adder circuit with the resistors R1 to R6 and the feedback resistor R7 of the amplifier AMP1. In the initial state, the switches SW1–SW5 connected in series with the resistors R2–R6 are all off, so that the output voltage determined by the ratio of the resistors R1 and R7 is supplied as the lowest reference voltage Vth6.

When, with the input timing of the second wave of the ringing current, the counter CNT1 counts up in accordance with the result of the comparison in the comparator circuit 5, the outputs (1) to (3) are sequentially activated in accordance with the count value and the switches SW1 to SW3 are turned on so that the resistors R2 to R4 are connected in parallel and respective voltages are added, thus outputting the reference voltages Vth5 to Vth3 in sequence.

Next, when the control signal S is output from the timing control circuit 4, an output (5) occurs in the off-hook detection reference voltage control circuit 56, by which the switch SW5 is energized and the resistor R6 is connected in parallel to add a further voltage. As a result, the reference voltage generating circuit 53 outputs the reference voltage Vth2 as the off-hook detection threshold voltage, upon which the off-hook monitoring operation is started. The operation thereafter is the same as that of the circuit shown in FIG. 12.

In the above cases, the digital circuit in the threshold value control circuit 6 is placed into an operating condition by being supplied with a timing signal upon occurrence of the ringer activation signal RNG. Further, the amplifier AMP1 and the comparator CMP1 are placed into operation with power supplies PD and VB from the inverted output $\bar{Q}$ of the flip-flop D-FF1.

When the ringer activation signal RNG is stopped, the flip-flop D-FF1 is also deactivated, and each circuit is placed in the quiescent condition. Thus, the ringtrip judging circuit of the present invention is placed in an operating condition and consumes supply power only during the called party ringing, and in other times, power down control is performed to prevent power consumption.

We claim:

1. A ringtrip judging circuit comprising:

a single comparator for comparing a detection value of a ringing current with a threshold value and for outputting the result of the comparison;

a threshold value control circuit for, during a prescribed period after the initiation of ringing signal transmission, supplying to said comparator a first threshold value that is changeable as function of the result of the comparison output from said comparator, thereby determining a second threshold value optimum for ringtrip judgement, and for supplying said second threshold value to said comparator; and a judging circuit for judging ringtrip based on the result of the comparison that said comparator outputs during application of said second threshold value.

2. A ringtrip judging circuit according to claim 1, wherein said threshold value control circuit changes said first threshold value in a steplike manner each time the output of said comparator changes during said prescribed period, and determines said second threshold value on the basis of said first threshold value at the end of said prescribed period.

3. A ringtrip judging circuit according to claim 2, wherein said threshold value control circuit includes a reference voltage controlling clock generating circuit for outputting a reference voltage controlling clock to change said first threshold value each time the output of said comparator changes during said prescribed period, a reference voltage control circuit for outputting a first control signal which varies in response to the reference voltage controlling clock output from said reference voltage controlling clock generating circuit, an off-hook detection reference voltage control circuit, for outputting a second control signal for outputting said second threshold value, and reference voltage output means for supplying said first threshold value to said comparator during said prescribed period, said first threshold value being a reference voltage output in accordance with said first control signal, and for supplying said second threshold value to said comparator after the completion of said prescribed period, said second threshold value being a reference voltage output in accordance with said second control signal.

4. A ringtrip judging circuit according to claim 3, wherein said reference voltage output means includes a selection circuit for selecting said first control signal during said prescribed period and said second control signal after the completion of said prescribed period, and reference voltage generating means for generating a reference voltage in accordance with the control signal selected by said selection circuit.

5. A ringtrip judging circuit according to claim 4, wherein said reference voltage generating means includes a reference voltage generating circuit for generating a plurality of reference voltages, and a reference voltage selection circuit for selecting a reference voltage in accordance with said control signal from among the plurality of reference voltages generated by said reference voltage generating circuit.

6. A ringtrip judging circuit according to claim 4, wherein said reference voltage generating means includes a reference voltage generating circuit for generating a single reference voltage in accordance with said control signal.

7. A ringtrip judging circuit according to claim 3, wherein said second control signal output from said off-hook detection reference voltage control circuit is supplied to said reference voltage control circuit as a reference voltage controlling clock applied to change said first control signal.

8. A ringtrip judging circuit according to claim 7, wherein said reference voltage output means includes a reference voltage generating circuit for generating a plurality of reference voltages, and a reference voltage selection circuit for selecting a reference voltage in accordance with said first control signal from among the plurality of reference voltages generated by said reference voltage generating circuit.

9. A ringtrip judging circuit according to claim 7, wherein said reference voltage output means includes a reference voltage generating circuit for generating a single reference voltage in accordance with said first control signal.

10. A ringtrip judging circuit according to claim 3, wherein said reference voltage output means includes a reference voltage generating circuit for generating a single reference voltage in accordance with said first control signal and for adding a prescribed voltage to said reference voltage in accordance with said second control signal.

* * * * *